US008832736B2

(12) United States Patent
Chen et al.

(10) Patent No.: US 8,832,736 B2
(45) Date of Patent: Sep. 9, 2014

(54) METHOD, APPARATUS AND SYSTEM FOR BITSTREAM EDITING AND STORAGE

(71) Applicant: Wistron Corporation, New Taipei (TW)

(72) Inventors: Mei-Man Chen, New Taipei (TW); Pei-Chen Chin, New Taipei (TW); Chih-Pin Liao, Tainan County (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/744,476

(22) Filed: Jan. 18, 2013

(65) Prior Publication Data

US 2013/0340000 A1 Dec. 19, 2013

(30) Foreign Application Priority Data

Jun. 19, 2012 (TW) .............................. 101121958 A

(51) Int. Cl.
*H04N 7/10* (2006.01)
*H04N 21/81* (2011.01)

(52) U.S. Cl.
CPC .................................. *H04N 21/812* (2013.01)
USPC ............................................. 725/35; 725/36

(58) Field of Classification Search
CPC .......................... H04N 21/812; H04N 21/4532
USPC ..................................................... 725/34–36
See application file for complete search history.

(56) References Cited

U.S. PATENT DOCUMENTS

| | | | |
|---|---|---|---|
| 6,985,635 B2 * | 1/2006 | Chen et al. ..................... | 382/250 |
| 7,568,210 B2 * | 7/2009 | Asmussen ....................... | 725/36 |
| 7,752,642 B2 * | 7/2010 | Lemmons ....................... | 725/32 |
| 7,870,576 B2 * | 1/2011 | Eldering ......................... | 725/34 |
| 7,912,897 B2 | 3/2011 | Grossman | |
| 7,979,877 B2 * | 7/2011 | Huber et al. .................... | 725/36 |
| 8,082,564 B2 * | 12/2011 | Wang et al. ..................... | 725/32 |
| 8,115,869 B2 | 2/2012 | Rathod et al. | |
| 8,406,311 B2 * | 3/2013 | Kamijo et al. ............ | 375/240.26 |
| 8,424,052 B2 * | 4/2013 | Abed ............................. | 725/136 |
| 8,539,527 B2 * | 9/2013 | Wright et al. ................... | 725/46 |
| 8,645,991 B2 * | 2/2014 | McIntire et al. ................ | 725/34 |
| 2007/0039018 A1 * | 2/2007 | Saslow et al. ................... | 725/22 |
| 2007/0250901 A1 * | 10/2007 | McIntire et al. ............... | 725/146 |
| 2008/0127250 A1 | 5/2008 | DaCosta | |
| 2009/0254932 A1 | 10/2009 | Wang et al. | |
| 2010/0257549 A1 * | 10/2010 | Nam ............................... | 725/25 |
| 2011/0160882 A1 * | 6/2011 | Gupta et al. .................... | 700/94 |
| 2012/0047527 A1 | 2/2012 | Lee et al. | |
| 2012/0072936 A1 | 3/2012 | Small et al. | |

* cited by examiner

*Primary Examiner* — Annan Shang
(74) *Attorney, Agent, or Firm* — McClure, Qualey & Rodack, LLP

(57) ABSTRACT

A method for bitstream editing is provided. The method includes steps of: fetching a first original image from a source multimedia bitstream; performing variation processing on the first original image to generate a plurality of transformed pictures; performing keypoint extraction according to comparison results of the transformed pictures to obtain a plurality of candidate pixels; locating a first advertisement bitstream from an advertisement bitstream database according to the plurality of candidate pixels; and inserting the first advertisement bitstream to the source multimedia bitstream.

30 Claims, 16 Drawing Sheets

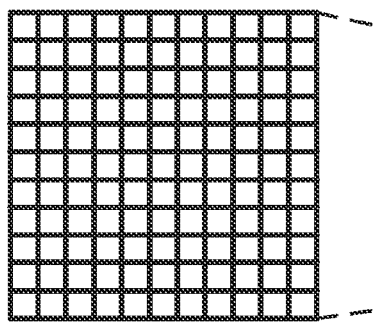
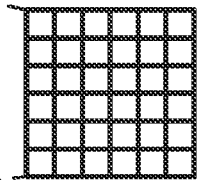
FIG. 8A
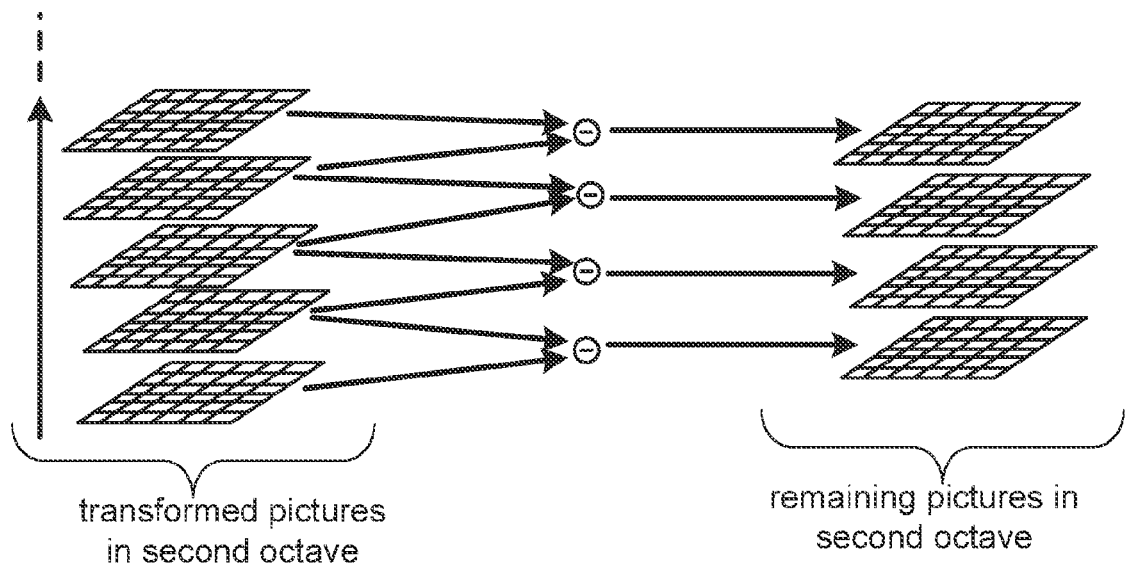
FIG. 8B

| Manufacturer number | Advertisement bitstream | Broadcasting period yy/mm/dd ~ yy/mm/dd | Corresponding reference pattern/ keypoint group | Index corresponding to reference pattern |
|---|---|---|---|---|
| A | Advertisement bitstream A1 | 12/01/02 ~ 12/06/13 | a1 | Index 1 |
| B | Advertisement bitstream B1 | 12/03/01 ~ 12/11/20 | b1 | Index 2 |
|  | Advertisement bitstream B2 | 11/06/15 ~ 12/10/10 | b2 | Index 3 |
|  |  |  | b3 | Index 4 |
| C | Advertisement bitstream C1 | 11/12/15 ~ 12/02/10 | c1 | Index 5 |
|  | Advertisement bitstream C2 | 12/05/05 ~ 12/07/07 | c2 | Index 6 |

FIG. 12

METHOD, APPARATUS AND SYSTEM FOR BITSTREAM EDITING AND STORAGE

This application claims the benefit of Taiwan application Serial No. 101121958, filed Jun. 19, 2012, the subject matter of which is incorporated herein by reference.

BACKGROUND OF THE INVENTION

1. Field of the Invention

The invention relates in general to a method, apparatus and system for editing, storing and providing bitstreams, and more particularly to a method, apparatus and system for editing, storing and providing bitstreams through keypoint comparison.

2. Description of the Related Art

Advertisement revenues are a critical foundation in operations of television stations. Currently, rather than being determined by contents of programs during which an advertisement is broadcasted in commercial breaks, a price of the advertisement is determined by timeslots. Thus, an entrepreneur paying for broadcasting the advertisement needs to select the price and timeslot in advance. As a substantial amount of money is paid to a television station, an entrepreneur expects a maximum beneficial result out of the advertisement broadcasted. Yet, a conventional advertisement broadcast approach may not always succeed in stimulating and increasing consumer desires in making purchases as anticipated by the entrepreneur.

To better explain a relation between program contents and advertisement contents, contents of a bitstream data are represented in long strips in the accompanying drawings. An unshaded part represents a source multimedia bitstream, i.e., actual contents of a television program; a shaded part represents advertisement contents.

FIG. 1A shows a schematic diagram of an unedited source multimedia bitstream and unedited advertisement bitstreams. A source multimedia bitstream 10 represents original television program contents before inserting in advertisement contents. A first advertisement bitstream 13a and a second advertisement bitstream 13 respectively represent contents of two advertisements.

FIG. 1B shows a schematic diagram of the advertisement contents inserted to the source multimedia bitstream in FIG. 1A. As observed from FIG. 1B, the contents of the source multimedia bitstream are not continuously played due to the newly inserted first advertisement bitstream 13a and the second advertisement bitstream 13b therein, and so an edited multimedia bitstream 15 is generated as a result.

When a television station broadcasts the edited multimedia bitstream 15, a sequence of the edited multimedia bitstream 15 perceived by a user is first-part program contents 10a, advertisement contents of the first advertisement bitstream 13a, second-part program contents 10b, advertisement contents of the second advertisement bitstream 13b, and third-part program contents 10c.

However, the conventional solution for editing bitstreams may incur an issue below. When contents of the source multimedia bitstream 10 are a movie associated with car racing, the advertisement contents of the first advertisement bitstream 13a and the second advertisement bitstream 13b may be advertisements selling nutritional supplements or furniture. That is, the program contents may be not at all relevant to the advertisements such that a viewer may not connect oneself with or be impressed by the advertisements broadcasted in the above approach.

To reinforce the relevancy between a program and an advertisement, the conventional solution adopts embedded marketing as an alternative approach. That is, when filming a program, a product to be advertised is arranged in an image of the program.

Taking the classic 007 movie series for example, numerous state-of-the-art products with novel functions including computers, sports cars or other technology products are utilized by a leading role in the movies. When the movies are newly launched, audiences at that time may be highly interested in the technology products seen in the movies, and sale numbers of the products are stimulated as a result. However, as the technology progresses continuously, the state-of-the-art products seen in the movies then may now be rather outdated. Usually, a movie is only broadcasted by a television station after a considerable period of time from a first launch date of the movie. Thus, at the time when the movie is broadcasted by a television station, it is possible that products placed in the movie as custom-made embedded marketing become outdated or even discontinued products when the movie is played over and over again.

For example, although a viewer may be quite impressed with a display device in a movie filmed ten years ago, at a current time point of ten years after the movie is filmed, it is unlikely that the viewer purchases a display device having a same model number as the display device appeared in the movie. For example, compared to ten years earlier, a mainstream technique of displays has long evolved from cathode ray tube (CRT) monitors to liquid crystal display (LCD) monitors. Therefore, although embedded marketing may coordinate with program contents for advertisements and publicity, such advertisement approach may on the other hand emphasize that products are outdated as the time passes by.

In view of the above, there is a need for a solution for inserting appropriate advertisement contents during broadcasting of programs to optimize advertising effects.

SUMMARY OF THE INVENTION

According to an aspect of the present invention, a method for bitstream editing is provided. The method includes steps of: fetching a first original image from a source multimedia bitstream; performing variation processing on the first original image to generate a plurality of transformed pictures; performing keypoint extraction according to comparison results of the transformed picture to obtain a plurality of candidate pixels; locating a first advertisement bitstream from an advertisement bitstream database according to the candidate pixels; and inserting the first advertisement bitstream to the source multimedia bitstream.

According to another aspect of the present invention, a system for bitstream editing is provided. The system includes: a multimedia bitstream database, for providing a source multimedia bitstream; an advertisement bitstream database, comprising a search engine and, providing a plurality of advertisement bitstreams; and a bitstream editing apparatus, including: a transceiving unit, in communication with the multimedia bitstream database and the advertisement bitstream database, for receiving the source multimedia bitstream and the plurality of advertisements bitstreams; and an editing unit, electrically connected to the transceiving unit, for performing variation processing on a first original image fetched from the source multimedia bitstream to generate a plurality of transformed pictures, and performing keypoint extraction according to comparison results of the transformed pictures to obtain a plurality of candidate pixels. A first advertisement bitstream is located from the advertisement bitstream database according to the candidate pixels. The editing unit inserts the first advertisement bitstream to the source multimedia bitstream after receiving the first advertisement bitstream via the transceiving unit.

According to another aspect of the present invention, an apparatus for bitstream editing is provided. The apparatus includes: a transceiving unit, for receiving a source multimedia bitstream from a multimedia bitstream database; and an editing unit, electrically connected to the transceiving unit, for performing variation processing on a first original image fetched from the source multimedia bitstream to generate a plurality of transformed pictures, and performing keypoint extraction according to comparison results of the transformed pictures to obtain a plurality of candidate pixels. The candidate pixels are transmitted to an advertisement bitstream database via the transceiving unit, and a first advertisement is located from the advertisement bitstream database according to the candidate pixels. The editing unit inserts the first advertisement to the source multimedia bitstream after the transceiving unit receives the first advertisement bitstream.

According to an aspect of the present invention, a method for advertisement bitstream storage is provided. The method includes steps of: performing keypoint extraction on a first reference pattern to obtain a first keypoint group, wherein the first reference pattern corresponds to a first advertisement bitstream; and storing mapping between the first keypoint group and the first advertisement bitstream.

According to another aspect of the present invention, a system for advertisement bitstream storage is provided. The system includes: a keypoint extraction server, for performing keypoint extraction on a first reference pattern to obtain a first keypoint group; and a storage server, in communication with the keypoint extraction server, for storing mapping between the first keypoint group and the first advertisement bitstream. The first reference pattern corresponds to the first advertisement bitstream.

According to another aspect of the present invention, a system for providing multimedia bitstreams is provided. The system includes: a storage server, for storing a source multimedia bitstream, and a plurality of advertisement bitstreams corresponding to a plurality of reference patterns; a keypoint extraction server, in communication with the storage server, for respectively performing keypoint extraction on the reference patterns to obtain a plurality of keypoint groups, the storage servers accordingly stores mappings between the keypoint groups and the advertisement bitstreams; and a bitstream editing apparatus, including: a transceiving unit, in communication with the multimedia bitstream database, for receiving the source multimedia bitstream; and an editing unit, electrically connected to the transceiving unit, for performing variation processing on a first original image fetched from the source multimedia bitstream to generate a plurality of transformed pictures, and performing keypoint extraction according to comparison results of the transformed pictures to obtain a plurality of candidate pixels. The transceiving unit transmits the candidate pixels to the bitstream database, which then locates a first advertisement bitstream according to the candidate pixels. The editing unit inserts the first advertisement received by the transceiving unit to the source multimedia bitstream.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 8A is a schematic diagram of transforming a first original image in first octave into a first original image in second octave;

FIG. 8B is a schematic diagram of generating transformed pictures and difference pictures by performing a variation calculation on a first original image in second octave;

FIG. 12 is a schematic diagram of mappings of advertisement bitstreams, reference patterns, keypoint groups and indices stored in a bitstream database; and, FIG. 13 is a flowchart of a method for multimedia bitstream editing applied to a bitstream editing apparatus according to an embodiment of the present invention.

DETAILED DESCRIPTION OF THE INVENTION

To avoid irrelevancy between advertisement contents and program contents, the present invention provides an approach that dynamically selects advertisement bitstreams to be inserted in response to contents of a source multimedia bitstream Bs. Such approach adaptively provides advertisement contents corresponding to program contents to eliminate an issue of outdated advertisements caused by product placement.

According to an embodiment of the present invention, a method for bitstream editing applied between a bitstream editing apparatus and a bitstream storage database is provided. The database pre-stores and provides multiple advertisement bitstreams to the bitstream editing apparatus. The bistream editing apparatus utilizes the received advertisement bistream for editing a source multimedia bitstream.

The bitstream editing apparatus first fetches an original image from the source multimedia bitstream An advertisement bitstream corresponding to contents of the original image from the database is located according to the contents of the original image. After that, the bitstream editing apparatus inserts the located advertisement bitstream to the source multimedia bitstream.

Operation details of the bitstream editing apparatus for editing the source multimedia bitstream and the located advertisement bitstream according to an embodiment of the present invention are described below with reference to FIGS. 2A, 2B and 2C.

Figure 1A:
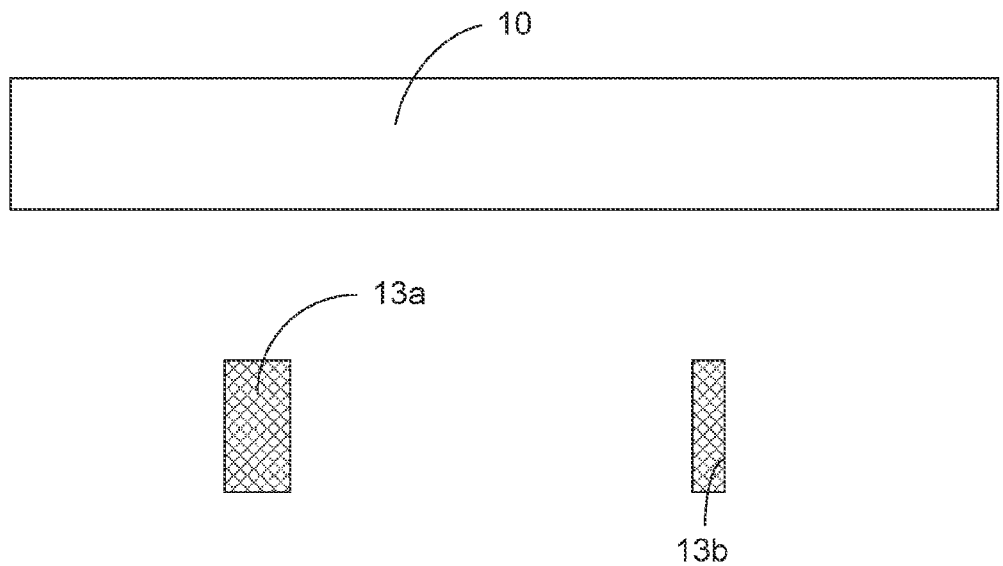
FIG. 1A (prior art) is a schematic diagram of an unedited source multimedia bitstream and unedited advertisement bitstreams.
Figure 1B:
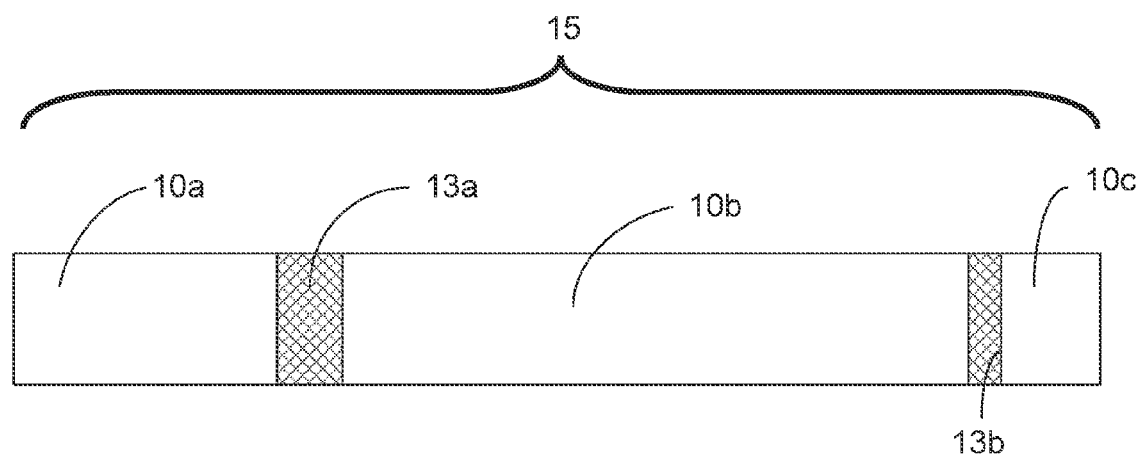
FIG. 1B (prior art) is a schematic diagram of the advertisement contents inserted to the source multimedia bitstream in FIG. 1A.
Figure 2A:
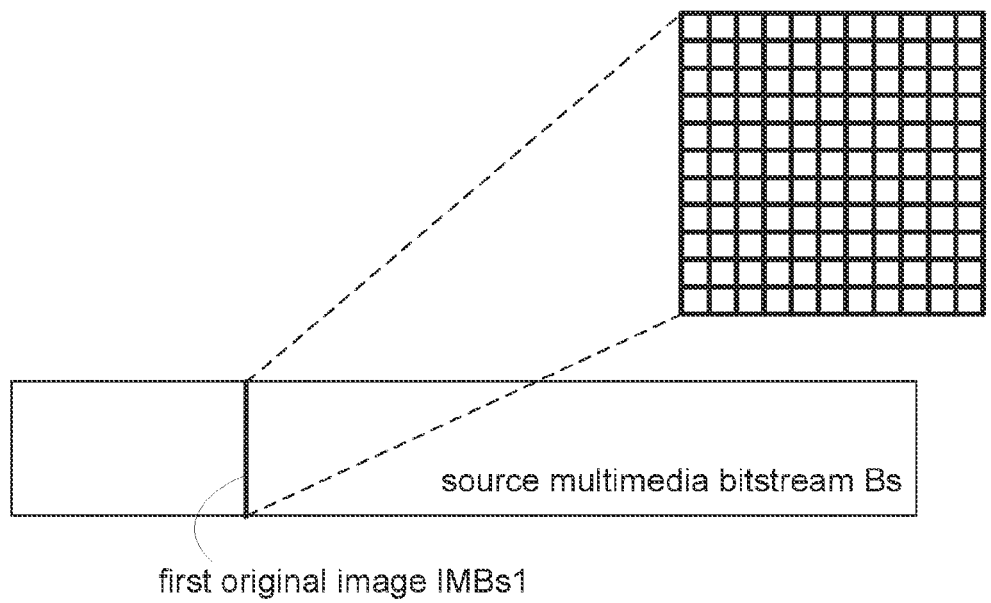
FIG. 2A is a schematic diagram of an original image fetched from a source multimedia bitstream by a bitstream editing apparatus according to a preferred embodiment of the present invention.

FIG. 2A shows a schematic diagram of an original image fetched from a source multimedia bitstream by a bitstream editing apparatus according to a preferred embodiment of the present invention. The bitstream editing apparatus first fetches an original image IMGs1 from a source multimedia bitstream Bs.

Assume that the first original image IMGs1 is in first octave. As shown in FIG. 2A, the first original image IMGs1 is scaled up, and it is composed of an array of pixels in the first octave. It should be noted that the pixels in the first octave are depicted to better illustrate the embodiment rather than a limitation to the present invention.

Once the first original image is fetched, it is determined whether the first original image IMGs1 contains any candidate pixel groups. A candidate pixel group may represent a trademark pattern, a sign pattern, a symbol pattern, a text pattern or an identification pattern. When candidate pixel groups are present, advertisement bitstreams corresponding to the candidate pixel groups are retrieved by searching an advertisement bitstream database, i.e., located, from the advertisement bitstream database according to the candidate pixel groups.

Figure 2B:
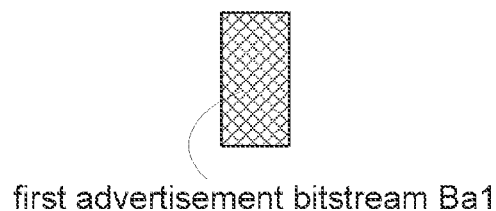
FIG. 2B is a schematic diagram of a first advertisement bitstream corresponding to a candidate pixel group obtained from an advertisement bitstream database according to the candidate pixel group in a first original image.

FIG. 2B shows a schematic diagram of a first advertisement bitstream obtained from the advertisement bitstream database according to the candidate pixel groups in the first original image.

Details of how the bitstream editing apparatus obtains the candidate pixel groups according to the first original image, and details of how the bitstream database locates the first advertisement bitstream from the advertisement bitstream database according to the candidate pixel groups shall be described shortly. FIG. 2B depicts that the bitstream database sends a located first advertisement bitstream Ba1 back to the bitstream editing apparatus.

Figure 2C:
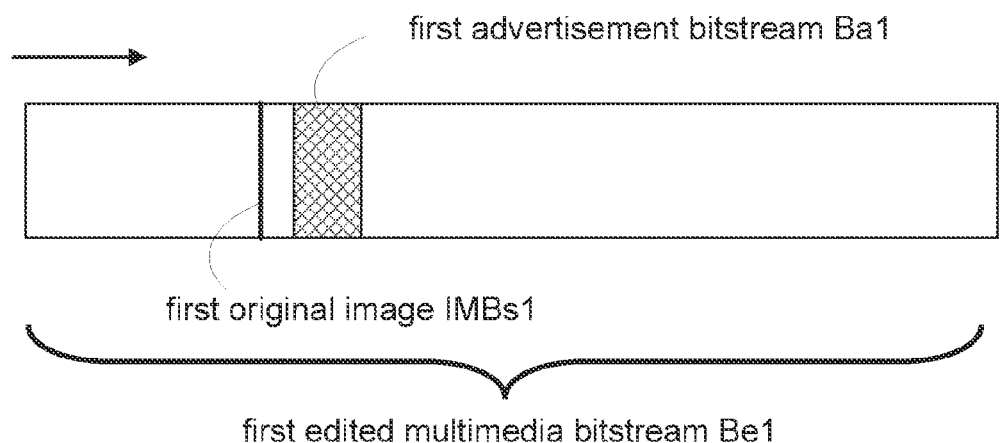
FIG. 2C is a schematic diagram of a first edited multimedia bitstream generated by inserting a first advertisement bitstream to a source multimedia bitstream.

FIG. 2C shows a schematic diagram of a first edited multimedia bitstream generated by inserting the first advertisement bitstream to the source multimedia bitstream. In FIG. 2C, an arrow pointing to the right indicates a playback direction and a time sequence of the first edited multimedia bitstream. As observed from FIG. 2C, once the first original image IMGs1 is fetched by the bitstream editing apparatus, the first advertisement bitstream Ba1 located accordingly from the advertisement bitstream database can be inserted to a next advertisement timeslot of the first original image IMGs1.

That is to say, when various patterns such as a trademark pattern, a sign pattern, a symbol pattern, a text pattern or an identification pattern having an identification property are present in the original image, and advertisement contents corresponding to the above patterns are also stored in the bitstream database, corresponding advertisement contents can be inserted into the original image to be later broadcasted.

For example, when a car racing scene appears in program contents (i.e., the original image), by identifying a trademark pattern of a car dealer showing in a car racing image in the original image, an advertisement of new cars launched by the car dealer can be broadcasted in an advertisement timeslot successive to the car racing scene. For another example, when a novel cell phone appears in program contents, advertisement contents of a manufacturer of the cell phone can be subsequently played after the original image with the cell phone.

More specifically, the bitstream editing apparatus fetches multiple original images of the source multimedia bitstream at different time points, and, in response to candidate pixel groups included in the original images, selects advertisement bitstreams corresponding to the candidate pixel groups from the bitstream database.

Thus, as a television station broadcasts multimedia bitstreams, contents of advertisement bitstreams watched by a user are advertisements that are highly relevant to original images watched immediately prior to the advertisement bitstreams. For example, through keypoint extraction on a first original image, when it is determined that a trademark of a car dealer A appears in the first original image, an advertisement (i.e., a first advertisement bitstream) of the car dealer A is then inserted to a successive advertisement timeslot.

From a user perspective, when a car model with exhilaratingly cool functions of the car dealer A is first seen in a movie program and then an advertisement of the car dealer A is seen in a subsequent timeslot, such advertisement broadcasting approach is quite impressive to a viewer as the advertisement contents and the program contents mutually connect with high relevancy.

Figure 2D:
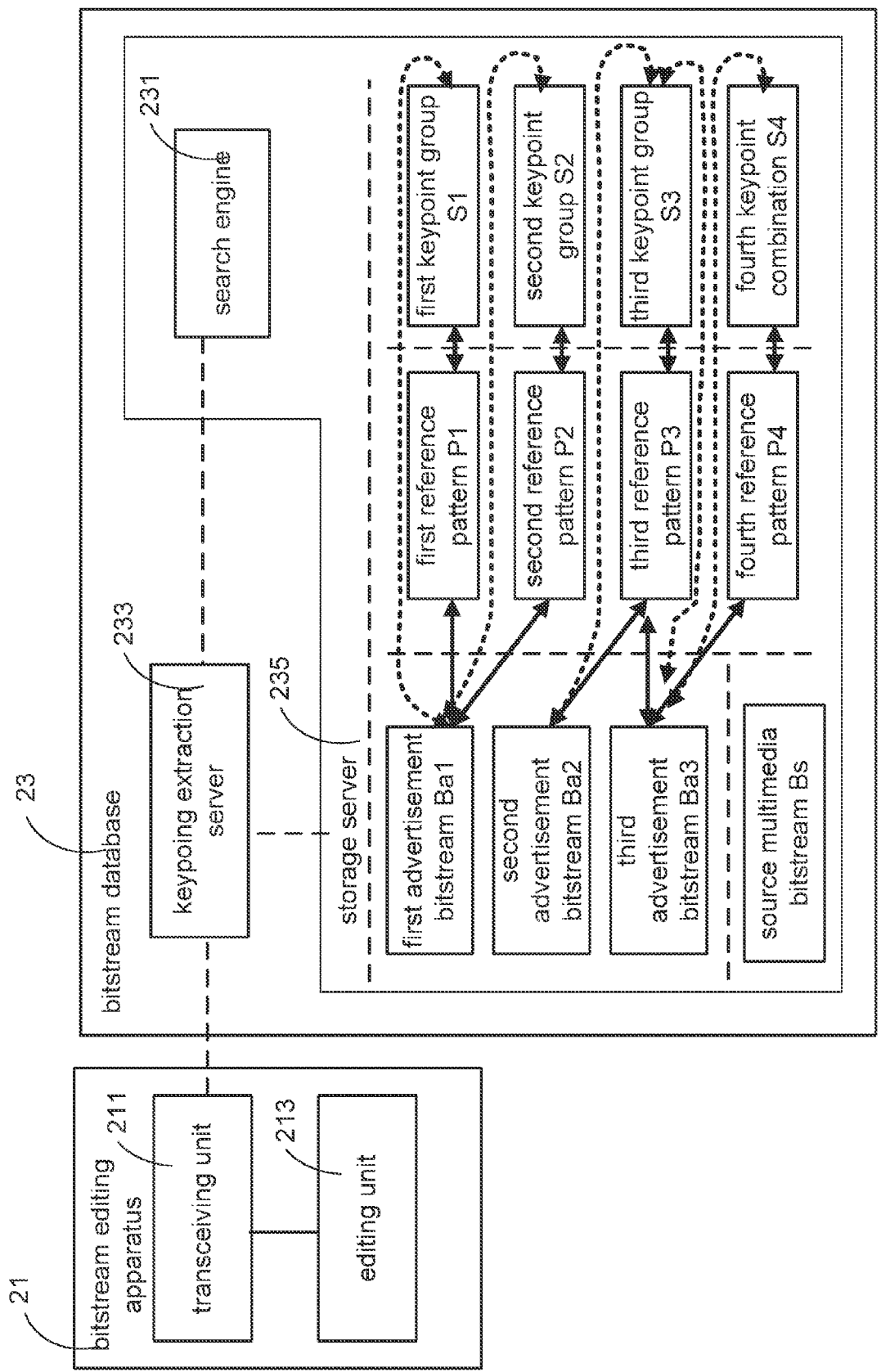
FIG. 2D is a schematic diagram of a system for providing multimedia bitstreams according to a preferred embodiment of the present invention.

FIG. 2D shows a schematic diagram of a system for providing multimedia bitstreams according to a preferred embodiment of the present invention. The system for providing multimedia bitstreams includes a bitstream database 23 and a bitstream editing apparatus 21. Purposes and functions of the bitstream database 23 and the bitstream editing apparatus 21 are as described in the following description.

Referring to FIG. 2D, the bitstream database 23 provides a source multimedia bitstream and a plurality of advertisement bitstreams (Ba1, Ba2, Ba3 . . . ). The bitstream editing apparatus 21 is in communication with the bitstream database 23.

The bitstream database 23 includes a storage server 235 and a keypoint extraction server 233 that are in communication with each other. The storage server 235 provides a source multimedia bitstream Bs, a plurality of advertisement bitstreams, a plurality of reference patterns, and a plurality of keypoint groups.

According to the present invention, the reference patterns may be patterns such as trademark patterns, sign patterns, symbol patterns, text patterns, or identification patterns having an identification property sufficient for identifying a manufacturer or a product. Further, the keypoint groups are keypoint descriptors of the reference patterns (P1, P2, P3 . . . ) obtained after the keypoint extraction server 233 performs keypoint extraction on the reference patterns.

The storage server 235 further includes a search engine 231. When the bitstream database receives the candidate pixel groups obtained from the original image, advertisement bitstreams corresponding to the candidate pixel groups can be retrieved by searching, i.e., located, by the search engine 231 from the storage server 235.

In the embodiment in FIG. 2D, a first advertisement bitstream Ba1, a second advertisement bitstream Ba2, and a third advertisement bitstream Ba3 are stored in the storage server 235. In addition, a first reference pattern P1, a second reference pattern P2, a third reference pattern P3, and a fourth reference pattern P4 are stored in the storage server 235 as well. It should be noted that, mapping (corresponding relationship) between the advertisement bitstreams and the reference patterns may be one-on-one, one-on-many, or many-on-one.

For example, the first advertisement bitstream Ba1 may simultaneously correspond to both the first reference pattern P1 and the second reference pattern P2. For example, when contents of the first advertisement bitstream Ba1 are filmed with respect to a car model A1 of a car dealer A, a trademark of the car dealer A is regarded as the first reference pattern P1, and an identification pattern for a car series of the car model A1 may be regarded as the second reference pattern P2. Thus, the first advertisement Ba1 may simultaneously correspond to both the first reference pattern P1 and the second reference pattern P2.

In FIG. 2D, the second advertisement bitstream Ba2 and the third advertisement bitstream Ba3 both correspond to the third reference pattern P3, and the third advertisement Ba3 also at the same time corresponds to the fourth reference pattern P4.

A possible example for the above mappings between the advertisement bitstreams and the reference patterns may be that, the third reference pattern P3 represents a trademark of a cell phone manufacturer B, and the second advertisement bitstream Ba2 is advertisement contents of all lines of products of the cell phone manufacturer B. Thus, the second advertisement bitstream Ba2 and the third reference pattern P3 correspond to each other.

Further, in the possible example, the fourth reference pattern P4 is an identification pattern of cell phones of a line B1 of the cell phone manufacturer B, and the third advertisement bitstream B3 is advertisement contents of the cell phones of the line B1. Since the trademark pattern of the cell phone manufacturer B may simultaneously correspond to advertisement contents of products of all the lines as well as the advertisement contents of the cell phones of the line B1, the third reference pattern B3 may then simultaneously correspond to the second advertisement bitstream Ba2 and the third advertisement bitstream Ba3.

With respect to situations where the same reference patterns correspond to a plurality of advertisement bitstreams, different playback approaches may be selected according to different applications. For example, assuming that the third reference pattern P3 serves as a comparison basis in a subsequent search process for an advertisement bitstream corresponding to the keypoint group satisfying the predetermined condition, to broadcast the second advertisement Ba2 or the third advertisement bitstream Ba3 can be configured. In an alternative approach, the second advertisement bitstream Ba2 can be broadcasted first, followed by the third advertisement bitstream Ba3.

The search engine 231 searches for the advertisement bitstream by comparing the candidate pixel groups and the keypoint groups. Therefore, the keypoint extraction server 233 first extracts keypoints of the reference patterns, i.e. the keypoint groups, and provides those to the search engine 231.

That is to say, the keypoint extraction server 233 performs keypoint extraction on the first reference pattern P1 to obtain a first keypoint group S1, performs keypoint extraction on the second reference pattern P2 to obtain a second keypoint group S2, and so forth. After obtaining the keypoint groups corresponding to the reference patterns, the keypoint extraction server 233 further records mappings between the keypoint groups, the reference patterns, and the advertisement bitstreams in the storage server 235, so that the mappings can later serve as reference for the search engine 231.

For example, in FIG. 2D, a first mapping between the first advertisement bitstream Ba1 and the first reference pattern P1 is indicated by a solid bidirectional arrow, and a second mapping between the first keypoint group S1 and the first reference pattern P1 is indicated by another solid bidirectional arrow. A dotted bidirectional arrow then indicates that the first keypoint group S1 may correspond to the first advertisement bitstream Ba1 according to the two foregoing mappings. Similarly, the mappings of the other advertisement bitstreams, reference patterns and keypoint groups are all indicated by arrows. In practice, the mapping relationships of the advertisement bitstreams, reference patterns and keypoint groups stored in the storage server 235 may be implemented in form of indices or pointers, and such modifications based on system requirements can be easily appreciated and made by a person having ordinary skill in the art.

After obtaining a first candidate pixel group provided by the bitstream editing apparatus according to the first original image, the search engine 231 compares the first candidate pixel group with a plurality of keypoint groups stored in the advertisement bitstream database. During the comparison process, a keypoint group satisfying a predetermined condition is retrieved. After comparing the candidate pixel group with all of the keypoint groups in the storage server 235, the matching keypoint group can be identified. The search engine 231 then locates an advertisement bitstream corresponding to the matching keypoint group according to the mappings previously stored, and sends the located advertisement bitstream to the bitstream editing apparatus.

For example, when a search result of the search engine 231 indicates that the first keypoint group S1 and the first candidate pixel group are highly similar, the first advertisement bitstream Ba1 corresponding to the first keypoint group S1 is outputted to the bitstream editing apparatus 21. When the search result of the search engine 231 indicates that the fourth keypoint group S4 and the first candidate pixel group are highly similar, the third advertisement bitstream Ba3 corresponding to the fourth keypoint group S4 is outputted to the bitstream editing apparatus 21.

As shown in FIG. 2D, the bitstream editing apparatus 21 includes a transceiving unit 211 and an editing unit 213 that are electrically connected to each other. The transceiving unit 211 is further in communication with the bitstream database 23.

Details of how the bitstream editing apparatus 21 obtains the reference patterns according to the fetched original image are further described below.

After fetching the first original image from the source multimedia bitstream, the bitstream editing apparatus 21 performs variation processing on the first original image to consequently generate a plurality of transformed pictures.

The bitstream editing apparatus 21 then performs keypoint extraction according to comparison results of the transformed pictures. When a trademark pattern, a sign pattern, a symbol pattern, a text pattern or an identification pattern is present in the first original image, a plurality of candidate pixels can be obtained after performing keypoint extraction. From the candidate pixels, the candidate pixel groups can be further obtained and provided to the bitstream database 23 for advertisement bitstream search process.

Assuming that the bitstream editing apparatus 21 obtains a plurality of candidate pixels according to the first original image, and obtains a first candidate pixel group according to the candidate pixels. Once the search engine 231 locates the advertisement bitstream corresponding to the keypoint group satisfying the predetermined condition (e.g., the first advertisement bitstream Ba1) from the bitstream database 23 according to the first candidate pixel group, the search engine 231 sends the first advertisement bitstream Ba1 back to the bitstream editing apparatus 21.

After receiving the first advertisement bitstream Ba1 via the transceiving unit 211, the bitstream editing device 213 inserts the first advertisement bitstream Ba1 to the source multimedia bitstream Bs.

In conclusion, with reference to FIGS. 2A to 2D, it is demonstrated that the bitstream editing apparatus according an embodiment of the present invention, after a viewer watches a part of a program, presents the viewer with advertisement contents having high relevancy to program contents, thereby optimizing advertising effects.

In the above descriptions, simple examples are given for illustrating some operations such as: create the mappings between the reference patterns and the advertisement bitstreams, and retrieve keypoint groups from the reference patterns. By doing so, the key point groups are mapped to the advertisement bitstreams, so that the mapping relationships may be utilized by the bitstream editing apparatus.

However, it should be noted that, implementation details and function configurations of the bitstream database and the bitstream editing apparatus are not limited to those depicted in the accompanying drawings and given in the associated descriptions. Similarly, the quantities of as well as the mappings between the advertisement bitstreams and the reference patterns are for illustrative purposes rather than limitations to the present invention.

The mappings between the advertisement bitstreams stored in the bitstream database and the keypoint groups are as explained in the foregoing descriptions. Under the premise that the mappings between the advertisement bitstreams and the reference patterns are known, the keypoint extraction server 233 respectively performs variation processing and keypoint extraction on a plurality of reference patterns to obtain a plurality of keypoint groups.

Further, the bitstream editing apparatus 211 similarly performs variation processing and keypoint extraction on the first original image fetched from the source multimedia bitstream Bs. Assuming that reference patterns for identification are present in the first original image, a plurality of candidate pixels can be obtained after the variation processing and keypoint extraction are performed on the first original image. Further, according to descriptors of the candidate pixels, a first candidate pixel group is obtained accordingly.

According to the present invention, after obtaining the first candidate pixel group, the bitstream editing apparatus sends the first candidate pixel group to the bitstream database via the transceiving unit. Regarding the first candidate pixel group as a comparison basis, the bitstream database compares the first candidate pixel group with a plurality of keypoint groups stored in the storage server.

According to comparison results of the first candidate pixel group and the keypoint groups, one keypoint group (e.g., a first keypoint group) satisfying a predetermined similarity level is identified. Since the mapping between the first keypoint group and the first advertisement bitstream is known, the bitstream database sends the first advertisement bitstream back to the bitstream editing apparatus 21.

Thus, both of the bitstream editing apparatus and the bitstream database need to perform variation processing and keypoint extraction processes. A main difference between the processes performed by the bitstream editing apparatus and the bitstream database is that, the bitstream editing apparatus processes the original image fetched from the source multimedia bitstream, whereas the bitstream database processes different reference patterns.

Figure 3A:
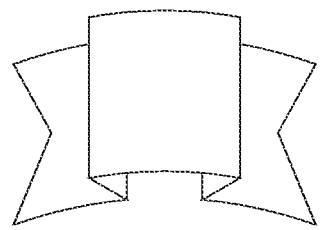
FIG. 3A is a schematic diagram of a reference pattern utilized as a source for keypoint extraction by a bitstream database.

FIG. 3A shows a schematic diagram of a reference pattern utilized as a source for keypoint extraction by a bitstream database. Under normal circumstances, a trademark pattern, a sign pattern, a symbol pattern, a text pattern or an identification pattern represented by a reference pattern has a distinct outline and keypoints. Thus, a keypoint group obtained by performing variation processing and keypoint extraction on the reference pattern are also more definite, and so a plurality of keypoint groups provided by the bitstream database may be utilized for comparing contents of an original image.

Figure 3B:
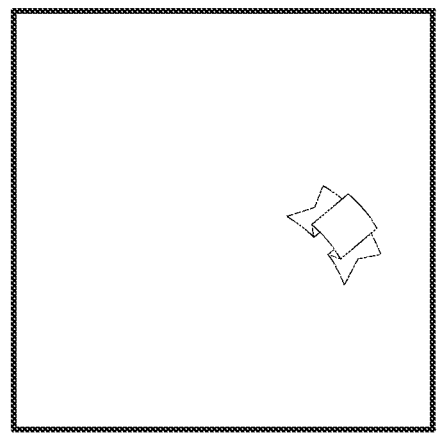
FIG. 3B is a schematic diagram of a first original image utilized as a source for keypoint extraction by a bitstream editing apparatus.

FIG. 3B shows a schematic diagram of a first original image utilized as a source for keypoint extraction by a bitstream editing apparatus. When a trademark pattern, a sign pattern, a symbol pattern, a text pattern or an identification pattern appears in an original image, it is usually not as clear as the pattern shown in FIG. 3A. Conversely, the trademark pattern, sign pattern, symbol pattern, text pattern or identification pattern frequently occupies only a small corner of an original image. Apart from being less clear, a size and an angle may also be different.

According to the descriptions associated with FIGS. 3A and 3B, when an advertisement bitstream database performs keypoint extraction on a reference pattern, the reference pattern is less likely affected by noises or other external factors. On the other hand, an appearance of the reference pattern in the original image is somewhat changed although a pattern similar to the reference pattern. Therefore, when the bitstream database and the bitstream editing apparatus determine whether similar patterns are present by comparing the reference pattern and the original image, instead of determining solely based on positions of pixels in the reference pattern, it can only be determined whether similar patterns are present in FIGS. 3A and 3B by way of keypoint comparison.

More specifically, according to the present invention, in the approaches for establishing corresponding keypoint groups according to reference patterns and identifying candidate pixels in an original image, similar contents (patterns) of the reference pattern and the original image are compared by way of keypoint comparison. With the keypoint comparison, displacements, rotations, scaling up/down, brightness differences and noises of a reference pattern appearing in an original image can be overcome.

The keypoint extraction process is divided into four stages: a first stage is to generate transformed pictures, a second stage is to detect pixel extremums of a octave space, a third stage is to select preferred candidate pixels, and a fourth stage is to determine the orientation of individual keypoints to obtain corresponding descriptors.

As previously stated, both the bitstream database and the bitstream editing apparatus need to perform variation processing (a variation calculation) and keypoint extraction, with a main difference being that their targets are different. In the bitstream database, the target of the variation calculation and keypoint extraction is a reference pattern; in the bitstream editing apparatus, the target of the variation calculation and keypoint extraction is an original image. Through the variation calculation and keypoint extraction processes, the individual keypoint descriptors obtained are compared to determine whether a part of the original image can be identified to be similar to any of the plurality of pre-stored reference patterns.

The variation processing and keypoint extraction processes performed on the original image and the reference pattern are substantially the same. In the description below, a first original image is regarded as the target, and details for generating the transformed pictures (the first stage, FIG. 4), detecting extremum pixels having a local extremum according to adjacent pixel blocks (the second stage, FIGS. 5A and 5B), and obtaining the keypoint descriptors (the fourth stage, FIGS. 6A, 6B, 6C, and 6D) shall be described respectively.

Figure 4:
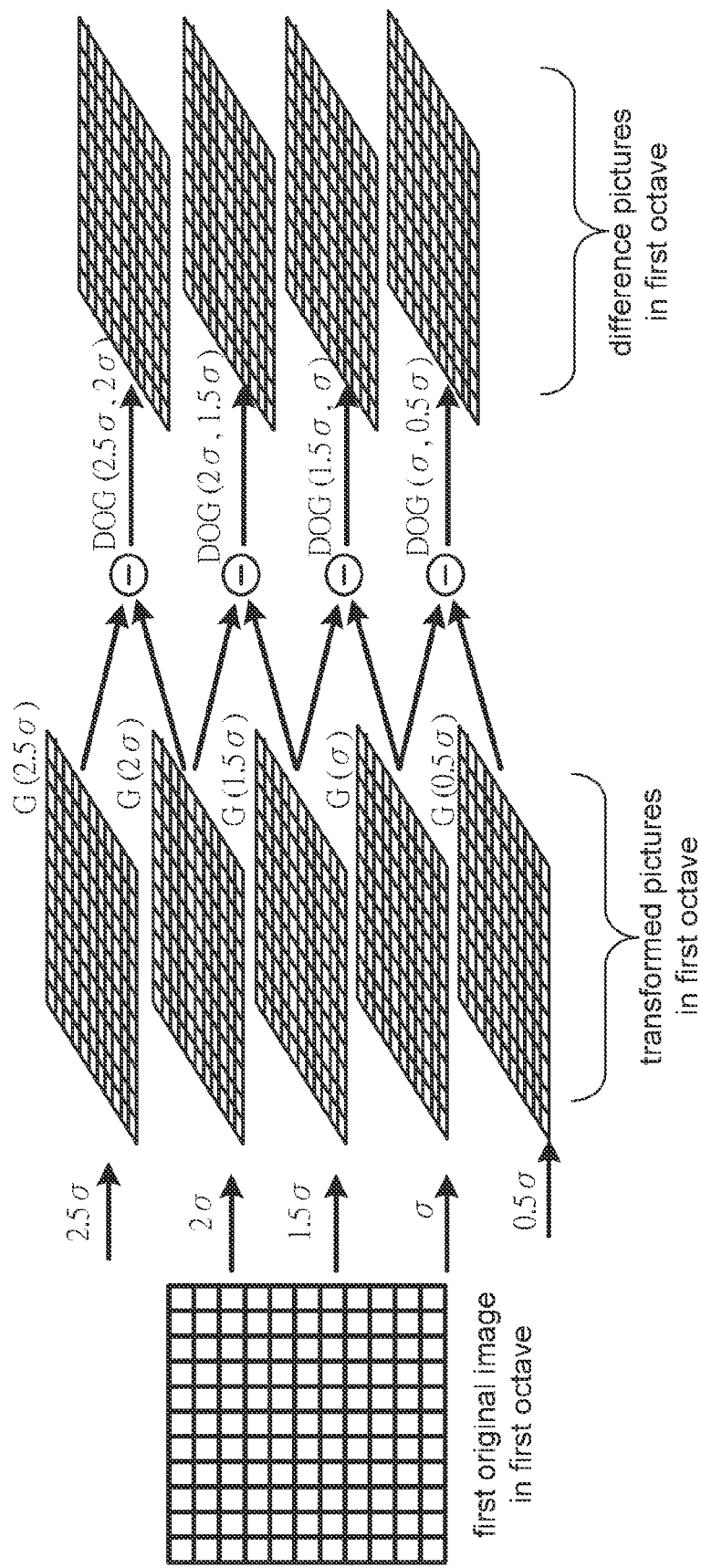
FIG. 4 is a schematic diagram of generating transformed pictures by performing a variation calculation on a first original image.

FIG. 4 shows a schematic diagram of generating transformed pictures by performing a variation calculation on a first original image. It should be noted that, the original image shown in FIG. 4 is an example for illustrative purposes, and the number of pixels included in the original image is not limited to that shown in diagram. For example, the original image may have a resolution of 640*480 pixels or another resolution.

In FIG. 4, assume that the first original image is in first octave. With respect to the first original image, a variation calculation is performed on the first original image using five different standard deviation values (2.5σ, 2σ, 1.5σ, σ, 0.5σ) to generate five transformed pictures corresponding to these standard deviation values (2.5σ, 2σ, 1.5σ, σ, 0.5σ). In other embodiments, other standard deviation values may be used when performing variation calculation.

It should be noted that, the variation calculation does not change octaves of the pictures. Therefore, the transformed pictures obtained from the first original image are also in the first octave. That is to say, the variation calculation is performed on all the pixels in the first octave in the first original image, and so the number of the pixels in the first octave in the transformed pictures equals the number of the pixels in the first octave in the first original image.

In other words, the step of performing variation processing on the first original image to accordingly generate a plurality of transformed pictures is: after performing the variation calculation on the first original image according to a plurality of standard deviation values, generating a plurality of transformed pictures also in the same first octave. In this preferred embodiment, a Gaussian calculation is selected as the variation calculation. In other embodiments, other types of calculations may also be adopted as the variation calculation.

For example, a Gaussian calculation is performed on the original image according to the first standard deviation value 2.5σ to generate a first transformed picture G(2.5σ), a Gaussian calculation is performed on the original image according to the second standard deviation value 2σ to generate a second transformed picture G(2σ), a Gaussian calculation is performed on the original image according to the third standard deviation value 1.5σ to generate a third transformed picture G(1.5σ), a Gaussian calculation is performed on the original image according to the fourth standard deviation value σ to generate a fourth transformed picture G(σ), and a Gaussian calculation is performed on the original image according to the fifth standard deviation value 0.5σ to generate a fifth transformed picture G(0.5σ).

It is seen from the right side of FIG. 4 that, after generating the transformed pictures, every two of the transformed pictures are subtracted from each other, i.e., to perform a difference-of-Gaussian (DOG) calculation. For illustrative purposes, a DOG represents a difference picture, and brackets indicate from which standard deviation values the DOG is calculated.

A first difference picture DOG(2.5σ, 2σ) represents a difference picture obtained by a subtracting the first transformed picture G(2.5σ) from the second transformed picture G(2σ). A second difference picture DOG(2σ, 1.5σ), a third difference picture DOG(1.5σ, σ), and a fourth difference picture DOG(σ, 0.5σ) can be deduced similarly.

After obtaining the difference pictures between every two transformed pictures using the DOG calculation, the second stage of selecting a plurality of extremum pixels having a local extremum according to comparisons of the difference pixels is entered.

Figure 5A:
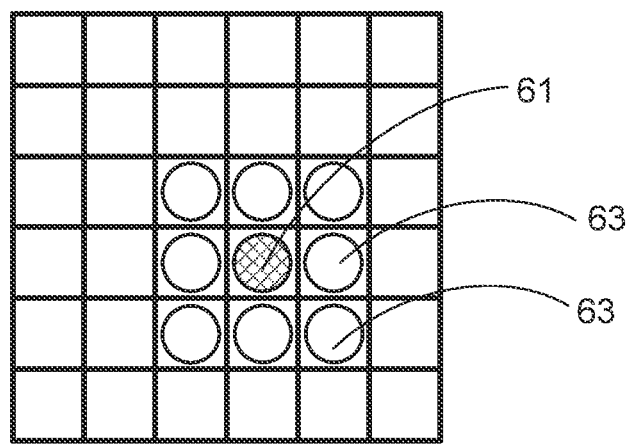
FIG. 5A is a schematic diagram of selecting a central difference pixel according to a central difference picture.

FIG. 5A shows a schematic diagram of selecting a central difference pixel according to a central difference picture. In each difference picture, pixels at different positions (x, y) are individually and sequentially selected, and the selected pixel is regarded as a center of the corresponding central difference picture.

Taking FIG. 5A for example, a pixel at a fourth row and a fourth column is selected as a central difference pixel 61. In FIG. 5A, a shaded circle represents a central difference pixel, and blank circles represent adjacent difference pixels 63 of the central difference pixel 61 in the same difference picture. That is to say, in the same difference picture, the adjacent difference pixels are the pixels located at upper-left, upper, upper-right, right, lower-right, lower, lower-left and left sides of the central difference pixel.

When determining whether the central difference pixel is a local extremum, apart from being compared with the adjacent difference pixels in the same difference picture, the central difference pixel also needs to be compared with adjacent difference pixels in adjacent difference pictures. Associated descriptions are given with reference to FIG. 5B.

The adjacent difference pictures here refer to difference pictures obtained from two standard deviation values for obtaining the central difference picture as well as one previous and one next standard deviation values of the two standard deviation values.

For example, when the central difference picture is the third difference picture obtained according to the standard deviation values (1.5σ, σ), the second difference picture obtained according to the standard deviations values (2σ, 1.5σ) and the fourth difference picture obtained according to the standard deviation values DOG(σ, 0.5σ) are the adjacent difference pictures of the third difference picture.

Figure 5B:
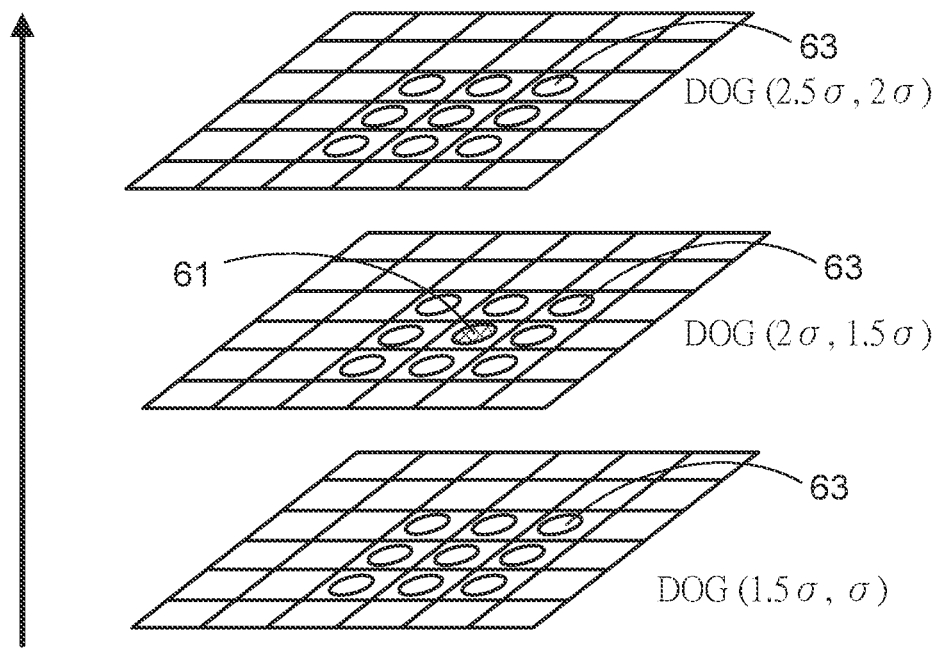
FIG. 5B is a schematic diagram of determining whether a value of a central difference pixel includes a local extremum when a selected difference pixel is regarded as a center of adjacent pixels blocks.

FIG. 5B shows a schematic diagram of determining whether a value of a central difference pixel is a local extremum. The adjacent difference pixels are a plurality of difference pixels included in an adjacent pixel block surround the central difference pixel, and a plurality of difference pixels in pixel blocks at adjacent difference pictures.

In other words, in a central difference picture, a value of the central difference pixel located at (x, y) is compared with values of 26 adjacent difference pixels (nine difference pixels of the difference pictures above and below, respectively, plus eight adjacent difference pixels of the central difference picture). When the central difference pixel has a maximum extremum or a minimum extremum compared to values of 26 adjacent difference pixels, the central difference pixel is selected as one of the extremum pixels.

The process of selecting a pixel having a local extremum as one of the candidate pixels from the difference pictures is summarized as follows.

One of the difference pictures is selected as a central difference picture. From a plurality of difference pixels in the central difference picture, a central difference pixel is selected. The value of the central difference pixel is compared with the values of a plurality of adjacent difference pixels of the central difference pixel. When the value of the central difference pixel has a local extremum compared to the values of the adjacent difference pixels, the central difference pixel is selected as one of the extremum pixels.

It should be noted that, the extreme pixels selected according to extremums are not always stable, and so certain extremum pixels with less stable properties should be deleted. Therefore, in the third stage, extremum pixels having preferred stability are further selected.

For example, when the extremum pixels are located on a same line, it is unnecessary to obtain all the pixels on the same line as the extremum pixels. Thus, from the candidate extremum pixels, those without high contrast and those that are border pixels can be deleted.

A method for determining whether an extremum pixel has low contrast is based on Taylor expansion as the formula below. In the formula, D is a result of the difference picture, x is the extremum pixel, and T is a transpose matrix. According to x and D, an offset $\hat{x}$ can be calculated.

$$D(x) = D + \frac{\partial D^T}{\partial x}x + \frac{1}{2}x^T\frac{\partial^2 D}{\partial x^2}x$$

$$\hat{x} = -\frac{\partial^2 D^{-1}}{\partial x^2}\frac{\partial D}{\partial x}.$$

The offset $\hat{x}$ may be regarded as an actual position of a local extremum, and is substituted into the Taylor expansion. When an obtained absolute value is smaller than a predetermined threshold, its corresponding pixel is determined to be low contrast. The pixel is eliminated at this point if the pixel has low contrast. The predetermined threshold may be set to 0.03, or another value according to application requirements by a person having ordinary skill in the art.

Figure 6A:
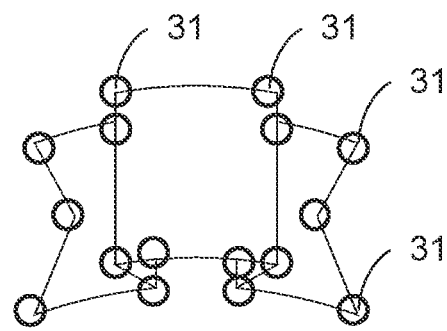
FIG. 6A is a schematic of a trademark of a ribbon serving as a reference pattern.

FIG. 6A shows a schematic of a trademark of a ribbon serving as a reference pattern. In the ribbon in FIG. 6A, sixteen keypoints 31 are depicted clearly in the reference pattern.

Figure 6B:
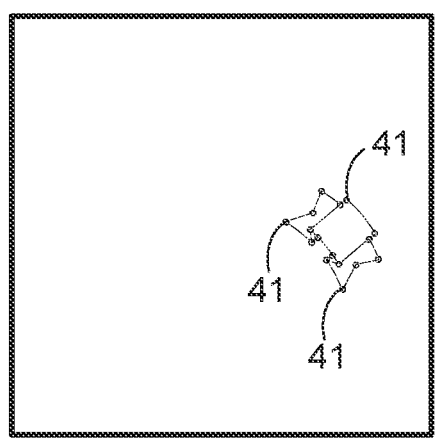
FIG. 6B is a schematic diagram of the trademark in FIG. 6A appearing in an original image.

FIG. 6B shows a schematic diagram of the trademark in FIG. 6A appearing in an original image. Comparing FIGS. 6A and 6B, when the trademark pattern appears in the original image, the trademark in the original image rarely appears as flat as in the reference pattern although the number of keypoints 41 is the same. Thus, in addition to determining keypoint pixels, the keypoints 41 need to be rotation invariant.

When defining a main direction of a keypoint pixel, an image gradient of pixels of blocks around the position of the keypoint pixel is first calculated to obtain the directionality. Considering the direction of the keypoint as a basis, the block centered at the keypoint is rotated in a way that the directionality of the keypoint is north. Thus, the keypoint is rotation invariant. Keypoint descriptors of the candidate pixel with defined main direction can then be obtained, i.e., directions and magnitudes of vectors of the candidate pixel are calculated.

Figure 7A:
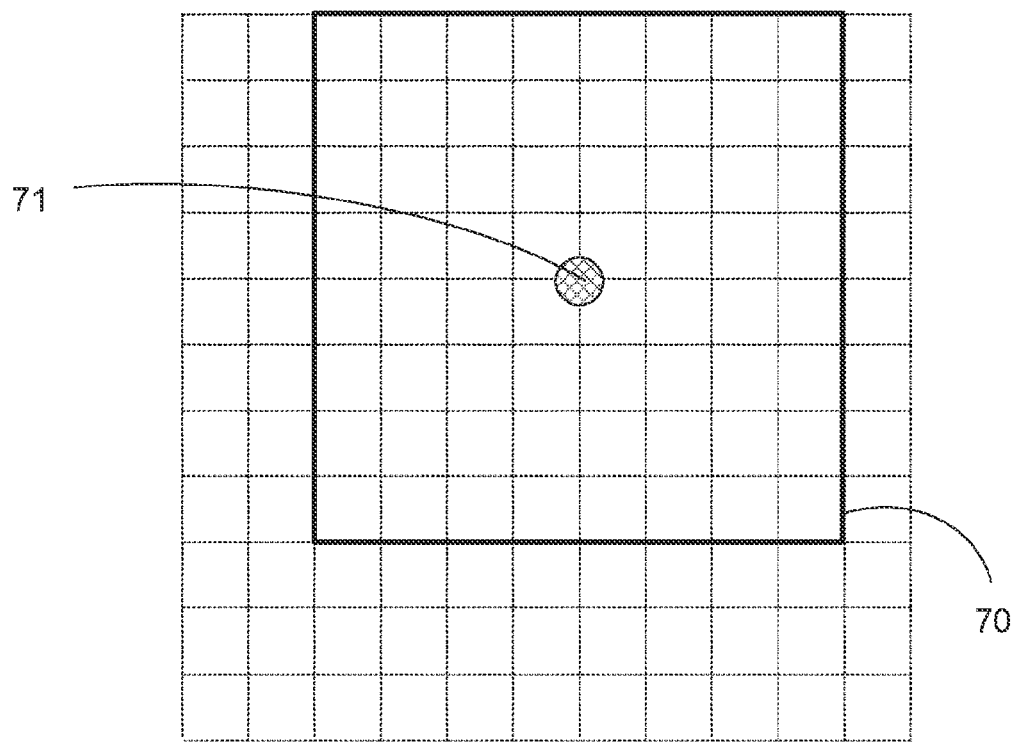
FIG. 7A is schematic diagram of obtaining a pre-selected description block for a candidate pixel by centering at a candidate pixel.

FIG. 7A shows a schematic diagram of obtaining a pre-selected description block for a candidate pixel by centering at the candidate pixel. Assuming that a pre-selected description block 70 is 8*8, each side of the pre-selected description block 70 then includes nine pixels, with the fifth-row and fifth-column pixel being a central pixel 71 of the pre-selected description block 70. In another embodiment, the size of the pre-selected description block 70 may be a different size other than 8*8.

Figure 7B:
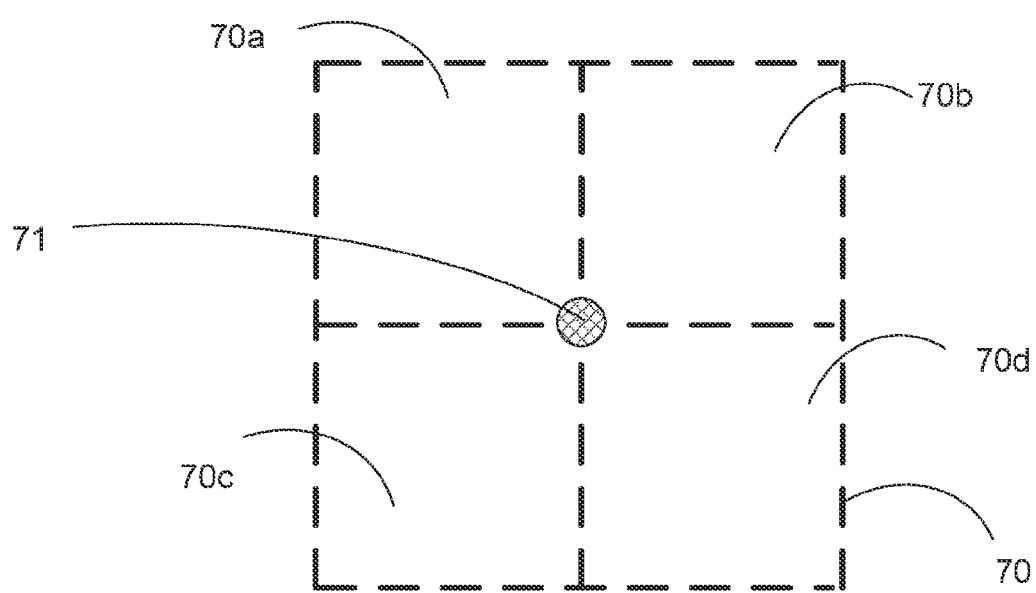
FIG. 7B is a schematic diagram of dividing a pre-selected description block into four sub-blocks.

FIG. 7B shows a schematic diagram of dividing the pre-selected description block in FIG. 7A into four sub-blocks. That is, the 8*8 pre-selected description block is divided into four 4*4 sub-blocks. The four sub-blocks are respectively a first sub-block 70a at upper-left relative to the central pixel 71, a second sub-block 70b relative to upper-right of the central pixel 71, a third sub-block 70c relative to lower-left of the central pixel, and a fourth sub-block 70d at lower-right relative to the central pixel 71.

Figure 7C:
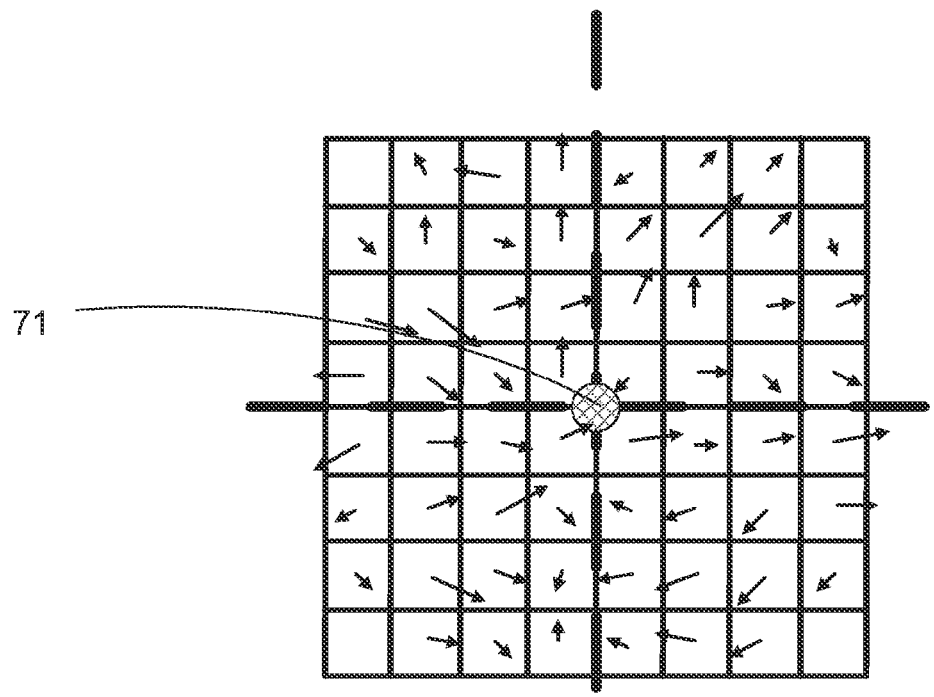
FIG. 7C is a schematic diagram of calculating description vectors for pixels relative to the candidate pixel at the center in the pre-selected block in FIG. 7A.

FIG. 7C shows a schematic diagram of calculating description vectors for pixels relative to the candidate pixel at the center in the pre-selected block in FIG. 7A.

From FIG. 7C, it is observed that each sub-block includes multiple one-directional arrows pointing towards different directions. These one-directional arrows represent distribution directionalities of the candidate pixel at the center compared to the other pixels in the sub-block.

Figure 7D:
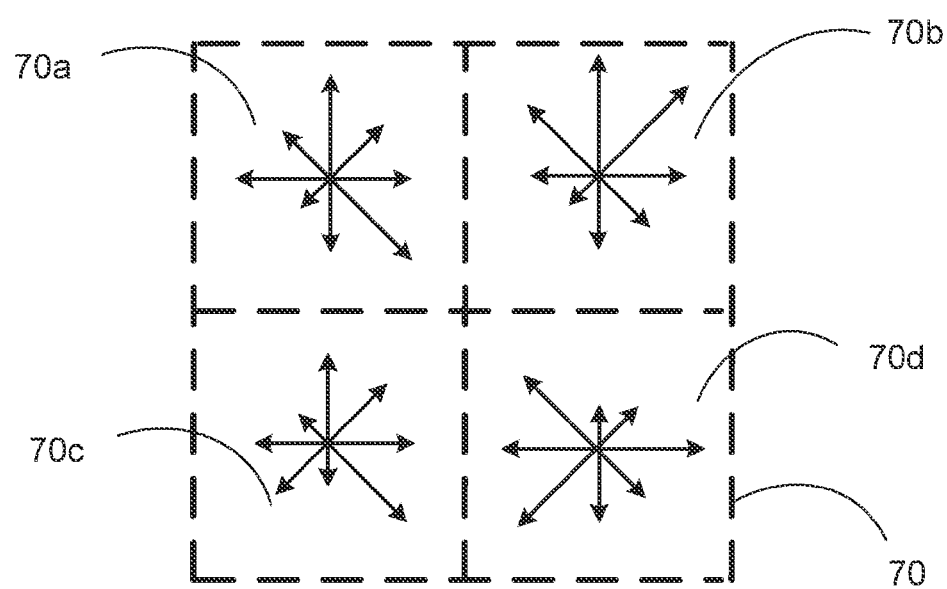
FIG. 7D is a schematic diagram of respectively calculating pixel description vectors of four sub-blocks.

FIG. 7D shows a schematic diagram of respectively calculating pixel description vectors of the four sub-blocks.

In FIG. 7D, each sub-block is calculated in eight directions. That is to say, each candidate pixel corresponds to the vectors corresponding to eight directions of the four sub-blocks.

Thus, since the first original image includes multiple candidate pixels and each of the candidate pixels has similar description vectors (pixel descriptions), a group of the candidate pixel descriptions is referred to a first candidate pixel group.

Similarly, with respect to the reference patterns, since each reference pattern includes multiple keypoints and each of the keypoints has similar vector descriptions (keypoint descriptors), a group of the keypoint descriptors is referred to as a keypoint group.

In continuation of the above, after eliminating the pixels without high contrast and the border pixels, the groups formed by the reserved pixels and the description vectors of the reserved pixels are to be utilized in the subsequent comparison process.

To determine keypoint extraction with a high accuracy, the variation calculation process on the original image/reference patterns may be cooperated with original image/reference patterns scaled into different octaves. That is to say, apart from the original image/reference patterns in the first octave, the original image/reference patterns can be further scaled into the original image/reference patterns in second octave, and the similar variation calculation is performed on the original image/reference patterns in the second octave. Associated descriptions are given below with reference to FIGS. 8A and 8B.

FIG. 8A shows a schematic diagram of transforming a first original image in first octave into a first original image in second octave.

Similar to FIG. 4, FIG. 8B shows a schematic diagram of generating transformed pictures and difference pictures by performing a variation calculation on a first original image in second octave.

According to the description associated with FIG. 8A, the first original image in the second octave is obtained after performing octave scaling on the first original image. For example, the original image is scaled down by one-half to obtain the original image having the second octave, i.e., a length and a width half of those of the first octave.

That is, assuming that the first octave are 640*480, after the octave scaling, the first reference pattern in the second octave is 320*240. Similarly, when the first original image in the first octave is scaled to other formats, or scaling the first octave to third octave, corresponding results can be obtained with similar calculations.

In FIG. 8B, after performing the variation calculation on the first original image in the second octave, a plurality of transformed pictures in the second octave are generated. Similarly, the candidate pixels can be obtained through calculations according to the transformed pictures in the second octave. Details of the above process are similar to those associated with FIGS. 5A, 5B, and 7A to 7D, and shall be omitted herein.

The processes of the foregoing variation calculation and keypoint extraction on the original image and the reference patterns are respectively summarized as the following.

For the first original image, the process of the variation operation and the keypoint extraction performed by the bitstream editing apparatus includes the steps of: performing a variation calculation on the first original image according to a plurality of standard deviation values to generate a plurality of transformed pictures in a first octave; obtaining a plurality of difference pictures in the first octave according to comparisons of the transformed pictures, wherein each of the difference pictures includes a plurality of difference pixels; selecting a plurality of extremum pixels having a local extremum according to the comparisons between the plurality of difference pixels; and selecting the extremum pixels with preferred identification properties as the candidate pixels from the extremum pixels.

The step of selecting the plurality of extremum pixels having the local extremum according to the comparisons between the plurality of difference pixels includes steps of: selecting one of the difference pictures as a central difference picture; selecting a central difference pixel from a plurality of difference pixels included in the central difference picture; respectively comparing value of the central difference pixel with values of its adjacent difference pixels; and when the value of the central difference pixel is a local extremum value compared to the values of the adjacent difference pixels, selecting the central difference pixel as one of the extremum pixels.

The step of selecting the extremum pixels having the preferred identification property as the candidate pixels from the extremum pixels includes steps of: deleting the extremum pixels without high contrast; and deleting the extremum pixels located at borders.

With respect to the first reference pattern, the process of the variation operation and the keypoint extraction performed by the bitstream database includes steps of: performing a variation calculation on the first reference pattern according to a plurality of standard deviation values to generate a plurality of first reference transformed patterns; performing keypoint extraction according to comparison results of the plurality of first reference transformed patterns to obtain a plurality of candidate pixels; and obtaining a first keypoint group according to the pixels.

The step of performing keypoint extraction according to the comparison results of the first reference transformed patterns to obtain the plurality of candidate pixels includes steps of: obtaining a plurality of first reference difference pictures according to the comparison results of the first reference transformed patterns; selecting a plurality of extremum pixels having a local extremum from the extremum pixels according to comparison results of the difference pixels; and selecting the extremum pixels having a preferred identification property as the candidate pixels.

Further, the step of selecting the plurality of extremum pixels having the local extremum according to the comparison results of the difference pixels further includes steps of: selecting one of the first reference difference pictures as a central difference picture; selecting a central difference pixel from a plurality of difference pixels included in the central difference picture; comparing value of the central difference pixel with values of its adjacent difference pixels; and when the value of the central difference pixel has the local extremum value compared to the values of the adjacent difference pixels, selecting the central difference pixel as one of the extremum pixels.

Further, the step of selecting the extremum pixels having the preferred identification property as the candidate pixels includes steps of: deleting the extremum pixels without high contrast; and deleting the extremum pixels located at the borders.

That is, through the variation calculation and the keypoint extraction processes, the bitstream editing apparatus obtains the candidate pixels according to the first original image, and further obtains the first candidate pixel group. Moreover, the bitstream database obtains a plurality of reference patterns and a plurality of corresponding keypoint groups according to the similar processes.

When the bitstream editing apparatus obtains the first candidate pixel group according to the candidate pixels and the first candidate pixel group records the corresponding pixel descriptions of the candidate pixels, the first candidate pixel group is utilized as a comparison basis for comparing with the keypoint groups stored in the advertisement bitstream database.

Figure 9A:
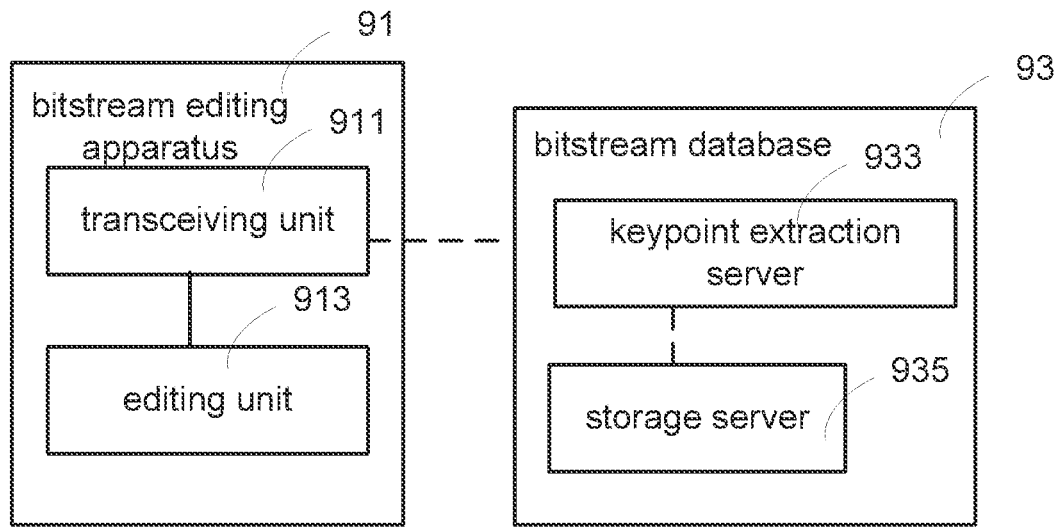
FIG. 9A is a schematic diagram of a first example of a system for providing multimedia bitstreams according to a preferred embodiment of the present invention.

FIG. 9A shows a schematic diagram of a first example of a system for providing multimedia bitstreams according to a preferred embodiment of the present invention. In FIG. 9A, a bitstream editing apparatus and a bitstream database are in communication with each other. Internal structures of the bitstream editing apparatus and the bitstream database are illustrated.

A bitstream editing apparatus 91 includes a transceiving unit 911 and an editing unit 913 that are electrically connected to each other. The bitstream database 93 is an integrated database for providing bitstream data (including multimedia bitstreams and advertisement bitstreams) and reference patterns. The bitstream database 93 obtains keypoint groups respectively corresponding to the reference patterns via a keypoint extraction server 933. The bitstream database also stores mappings between keypoint groups and reference patterns in a storage server 935.

Figure 9B:
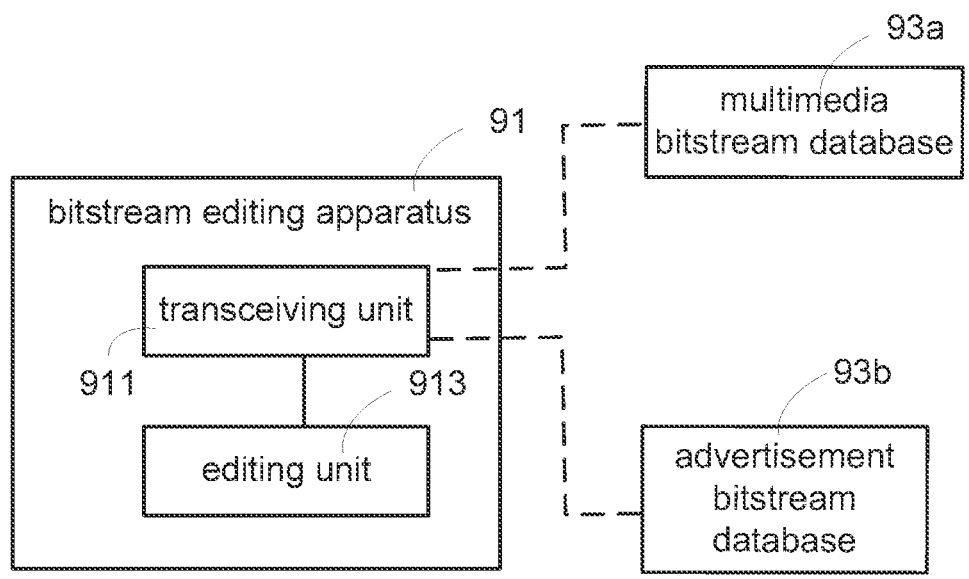
FIG. 9B is a schematic diagram of a second example of a system for providing multimedia bitstreams according to a preferred embodiment of the present invention.

FIG. 9B shows a schematic diagram of a second example of a system for providing multimedia bitstreams according to a preferred embodiment of the present invention. In FIG. 9B, a situation where multimedia bitstreams and advertisement bitstreams are provided from different sources. That is, a multimedia bitstream is provided by a multimedia bitstream database 93a, and a plurality of advertisement bitstreams are provided by an advertisement bitstream database 93b.

Further, the bitstream editing apparatus 91 includes a transceiving unit 911 and an editing unit 913 that are electrically connected to each other. The transceiving unit 911 is in communication with the multimedia bitstream database 93a and the advertisement bitstream database 93b.

Similarly, the bitstream editing apparatus 91 receives the source multimedia bitstream from the multimedia bitstream database 93 via the transceiving unit 911. The editing unit 913 then performs variation processing and keypoint extraction processes similar to those in FIG. 9A on an original image fetched from the source multimedia bitstream. A main difference between FIGS. 9A and 9B is that, the transceiving unit 911 transmits the candidate pixels to the advertisement bitstream database 93b, and receives the located advertisement bitstreams via the bitstream database 93b.

It can be concluded from the descriptions associated with FIGS. 9A and 9B that, the concept of the present invention is applicable to situations where whether sources of the multimedia bitstreams and the advertisement bitstreams are the same or different.

Figure 10A:
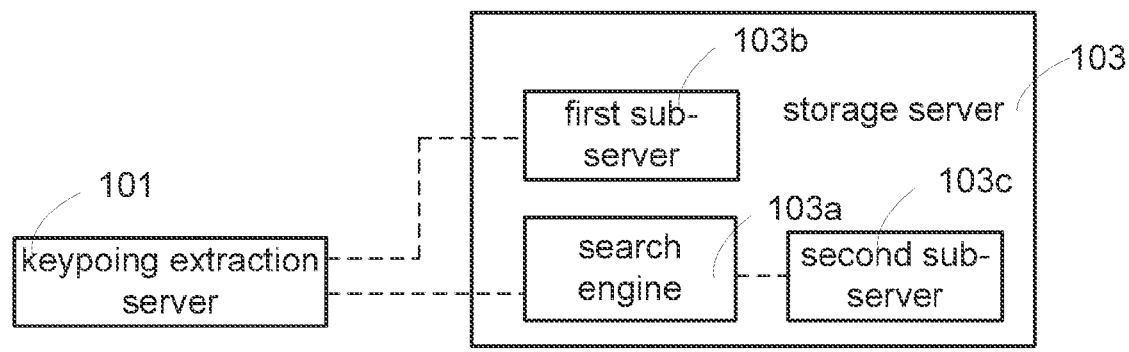
FIG. 10A a schematic diagram of a first example of the advertisement bitstream database in FIG. 9B.

FIG. 10A shows a schematic diagram of a first example of the advertisement bitstream database in FIG. 9B. A storage system for the advertisement bitstreams includes a keypoint extraction server 101 and a storage server 103a that are in communication with each other.

The keypoint extraction server 101 performs keypoint extraction on reference patterns to obtain keypoint groups. The storage server 103 stores mappings between the keypoint groups and the advertisement bitstreams.

The storage server 103 further includes a search engine 103a, a first sub-server 103b and a second sub-server 103c. The search engine 103 provides a search function for the use of the bitstream editing apparatus for obtaining the keypoint groups. The first sub-server 103b is in communication with the keypoint extraction server 101, and stores the reference patterns, the keypoint groups, and mappings between the reference patterns and the keypoint groups. The second sub-server 103c is in communication with the search engine 103a, and stores the mappings between the keypoint groups and the advertisement bitstreams.

In practice, the search engine 103a may sequentially assign corresponding index values to respectively keypoint groups according to a generation sequence of the keypoint groups. For example, a first index is assigned to a first keypoint group, a second index is assigned to a second keypoint group, and so forth. Thus, the first sub-server 103b stores the mapping between the first index and the first keypoint group; and the second sub-server 103c stores the mapping between the first index and the first advertisement bitstream.

As the search engine 103a searches for the advertisement bitstream, the search engine 103a first obtains the first index from the first sub-server 103b according to the mapping between the first keypoint group and the first index. Consequently, the first advertisement bitstream is obtained from the second sub-server 103c according to the mapping between the first index and the first advertisement bitstream.

Figure 10B:
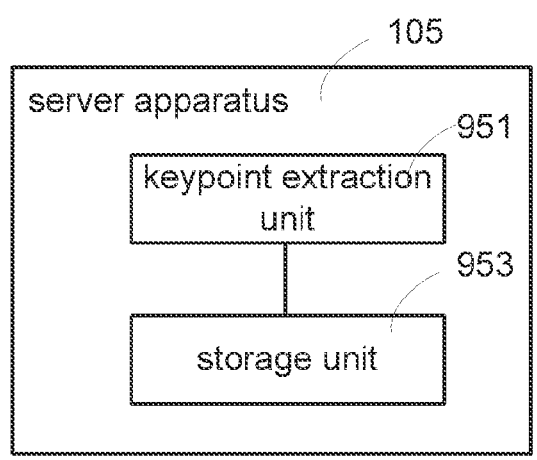
FIG. 10B is a schematic diagram of a second example of the advertisement bitstream database in FIG. 9B.

FIG. 10B shows a schematic diagram of a second example of the advertisement bitstream database in FIG. 9B. In FIG. 10B, the advertisement bitstream database is implemented as a single server apparatus. A server apparatus 105 includes a keypoint extraction unit 951 and a storage unit 953 that are electrically connected to each other. The keypoint extraction unit 951 and the storage unit 953 respectively perform keypoint extraction on the reference patterns, and store the mappings between the advertisement bitstreams and the keypoint groups.

According to the above descriptions, the present invention provides a latest advertisement strongly connected with the program contents (e.g., a video or a digital television program) of the broadcasted bitstreams. The approach based on the present invention is capable of providing a most up-to-date advertisement with respect to a product brand appearing in video contents to significantly enhance advertising effects.

Figure 11A:
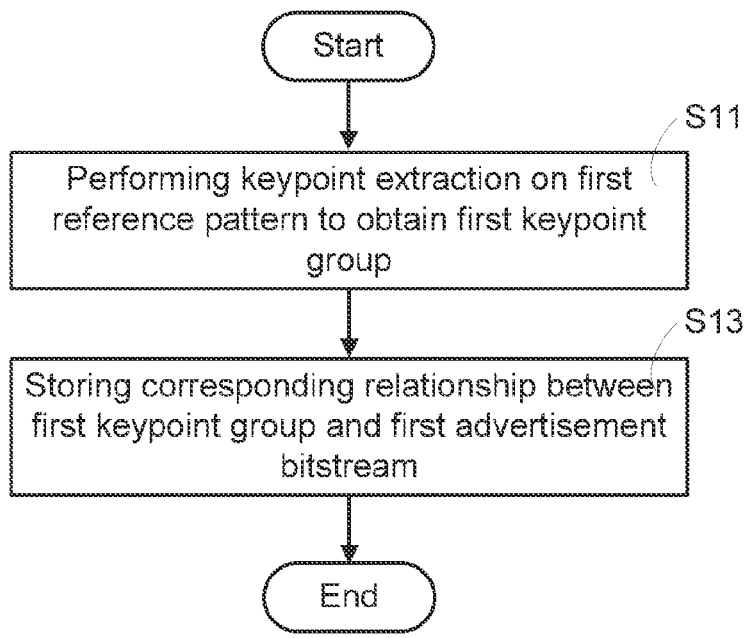
FIG. 11A is a flowchart of a method for advertisement bitstream storage according to an embodiment of the present invention.

FIG. 11A shows a flowchart of a method for advertisement bitstream storage according to an embodiment of the present invention. The method is applied to a bitstream database, and includes the following steps.

In step S11, keypoint extraction is performed on a first reference pattern in a first advertisement bitstream to obtain a first keypoint group. In step S13, mapping between the first keypoint group and the first advertisement bitstream is stored.

Figure 11B:
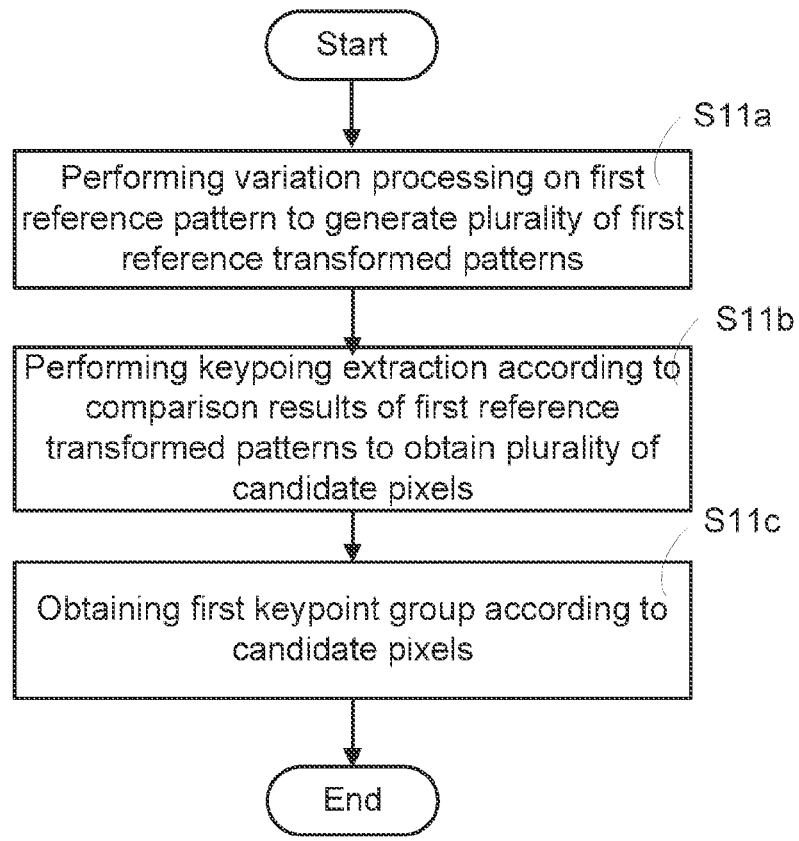
FIG. 11B is a detailed flowchart of step S11 in FIG. 11A.

FIG. 11B shows a detailed flowchart of step S11 in FIG. 11A. That is, the step of performing keypoint extraction on the first reference pattern to obtain the keypoint group includes the following steps.

In step S11a, variation processing is performed on the first reference pattern to generate a plurality of first reference transformed patterns. In step S11b, keypoint extraction is performed according to comparison results of the first reference transformed patterns to obtain a plurality of candidate keypoint pixels. In step S11c, the first keypoint group is obtained according to the candidate keypoint pixels.

Also with reference to FIG. 4, the first reference pattern is in the first octave, and step S11a is generating the first reference transformed patterns by performing a variation calculation on the first reference pattern according to a plurality of standard deviation values. It should be noted that, the standard deviations values $0.5\sigma$, $\sigma$, $1.5\sigma$, $2\sigma$ and $2.5\sigma$ in FIG. 4 are adopted as examples, and selections and the number of the standard deviation values can be adjusted according to actual application requirements.

Further, preferred determination results of the keypoint extraction process can be rendered when the keypoint extraction process is performed based on transformed pictures obtained from the calculation variation according to transformed pictures in different octaves. Thus, the preferred determination results can then be utilized for extracting the candidate pixels.

Accordingly, step S11 further includes steps of: performing octave scaling on the first reference pattern in the first octave to generate the first reference pattern in the second octave; and performing the variation calculation on the first reference pattern in the second octave respectively according to the standard deviation values to obtain the plurality of reference transformed patterns in the second octave.

It should be noted that, the first octave of the reference pattern and the first octave of the original image respectively represent octaves of a status of sources of the reference pattern and the original image. Further, the first octave of the reference patterns need not be the same as that of the original image. In addition, the standard deviation values adopted for the variation calculation on the first reference pattern in the first octave and the first reference pattern in the second octave are not limited to be identical.

The size of the first reference pattern in the second octave is smaller than the size of the first reference pattern in the first octave. To achieve an even more ideal pattern keypoint extraction result, the similar approach may also be employed to perform octave scaling on the first reference pattern to generate the first reference pattern in third octave. The variation calculation is similarly performed on the first reference pattern in the third octave. Details thereof are similar to those in the foregoing descriptions, and shall be omitted herein.

Figure 11C:
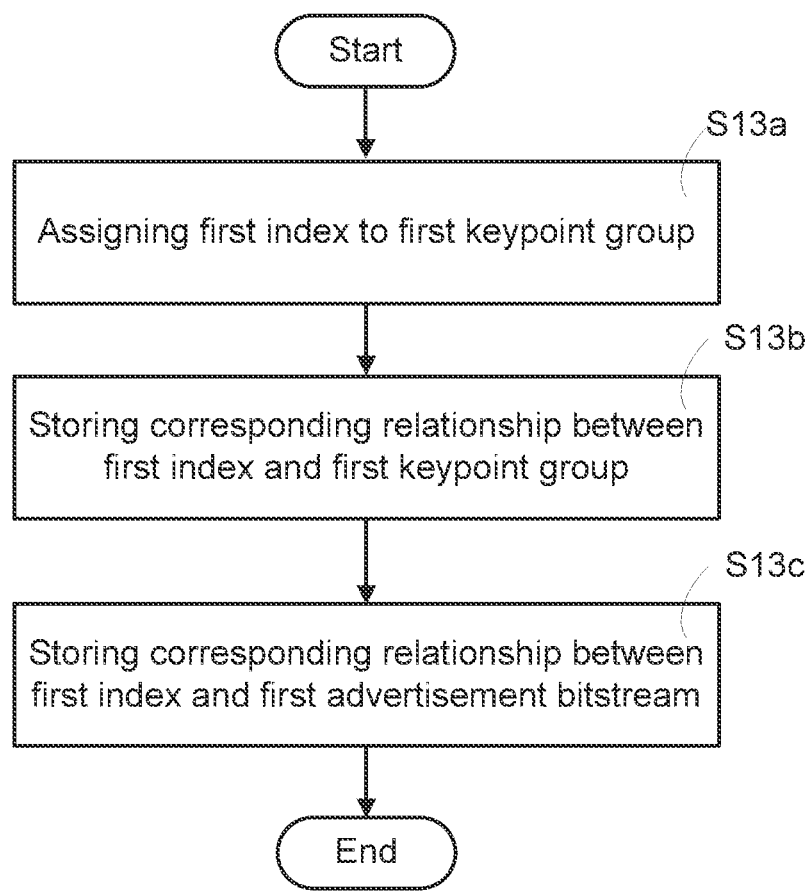
FIG. 11C is a detailed flowchart of step S13 in FIG. 11A.

FIG. 11C shows a detailed flowchart of step S13 in FIG. 11A. That is, the step of storing the mapping between the first keypoint group and the first advertisement bitstream includes steps of: assigning a first index to the first keypoint group (step S13a); storing mapping between the first index and the first keypoint group (step S13b); and storing mapping between the first index and the first advertisement bitstream (step S13c).

FIG. 12 shows a schematic diagram of mappings of advertisement bitstream contents, reference patterns, keypoint groups and indices stored in a bitstream database.

In FIG. 12, the first column is a manufacturer number, the second column is contents of advertisement bitstreams, and the third column is a scheduled period of advertisement broadcasting. The fourth column represents advertisement bitstreams and corresponding reference patterns/keypoint groups. The reference patterns and the keypoint groups are listed in the same column since they have a one-on-one relationship. A fifth column is indices corresponding to the reference patterns.

Referring to FIG. 12, apart from representing the manufacturers by different reference patterns, the same manufacturer may also correspond to different reference patterns. Further, the mappings between the advertisement bitstreams and the reference patterns may also be different. Further, when selecting the advertisement bitstream, a broadcast period in the third column may also be referred to confirm whether the selected advertisement bitstream is in the scheduled broadcast period.

In FIG. 12, assume that a manufacturer A provides an advertisement bitstream A1, which corresponds to a reference pattern a1. An index 1 is further assigned to the reference a1. Thus, the manufacturer, the advertisement bitstream and the reference pattern all have a one-on-one relationship.

Assume that a manufacturer B provides an advertisement bitstream B1 and an advertisement bitstream B2. The advertisement bitstream B1 corresponds to a reference pattern b1 and a reference pattern b2; the advertisement bitstream B2 corresponds to a reference pattern b3. A keypoint group b1 and a keypoint group b2 are obtained according to the reference pattern b1 and the reference pattern b2, and an index 2 and an index 3 are further assigned to the keypoint group b1 and the keypoint group b2. A keypoint group b3 is obtained according to the reference pattern b3, and an index 4 is further assigned to the keypoint group b3. In this example, the manufacturer provides multiple advertisement bitstreams, and each of the advertisement bitstreams corresponds to one or multiple advertisement bitstreams.

Assume that a manufacturer C provides an advertisement bitstream C1 and an advertisement bitstream C2. The advertisement bitstream C1 corresponds to a reference pattern c1; the advertisement bitstream C2 corresponds to a reference pattern c2. An index is assigned to a keypoint group obtained according to the reference pattern c1. That is, an index 5 is assigned to the keypoint group c1, and an index 6 is assigned to the keypoint group c2. In this example, the manufacturer provides multiple advertisement bitstreams, and each of the advertisement bitstreams corresponds to one reference pattern.

Figure 13:
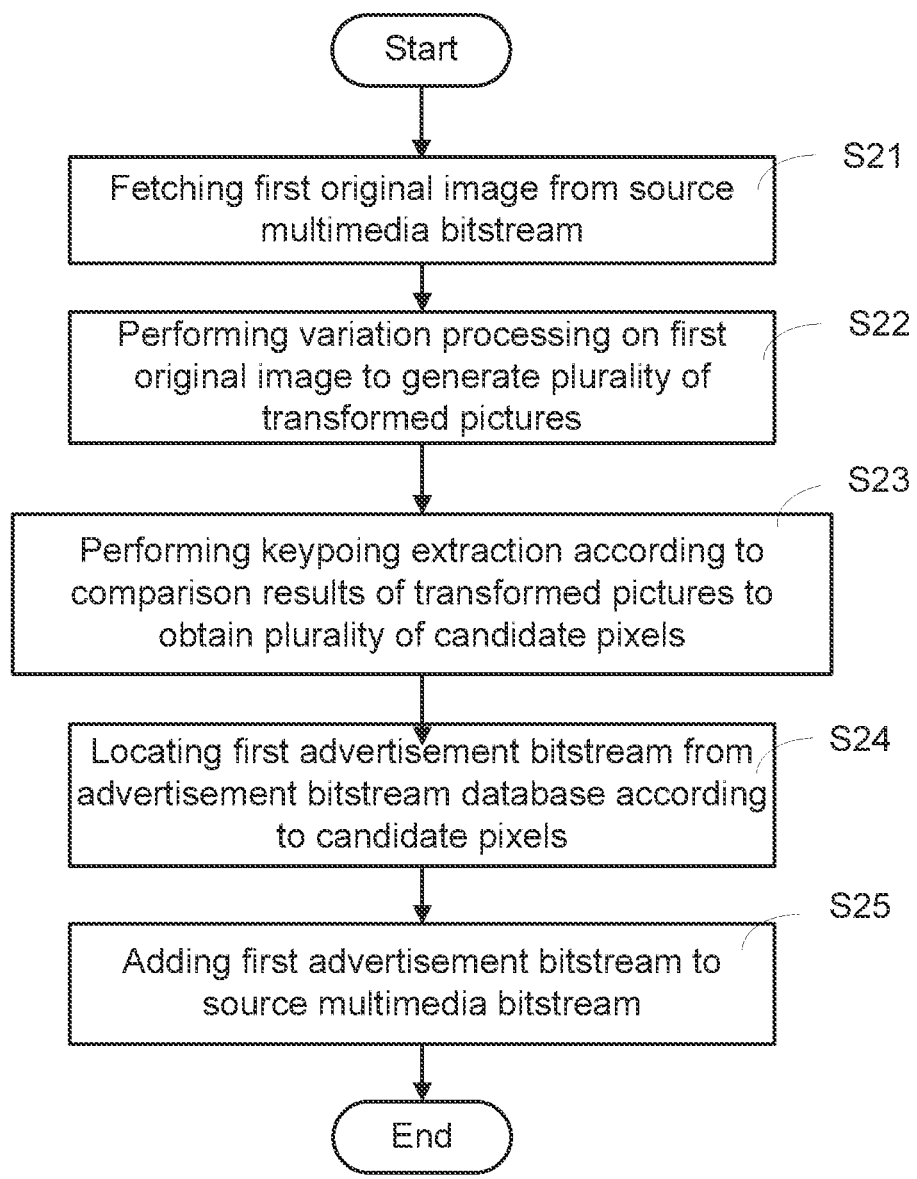

FIG. 13 shows a flowchart of a method for multimedia bitstream editing applied to a bitstream editing apparatus according to an embodiment of the present invention. The method includes the following steps.

In step S21, a first original image is fetched from a source multimedia bitstream. In step S22, variation processing is performed on the first original image to generate a plurality of transformed pictures. In step S23, keypoint extraction is performed according to comparison results of the transformed pictures to obtain a plurality of candidate pixels. In step S24, a first advertisement bitstream is found by searching, i.e., located, from an advertisement bitstream database according to the candidate pixels. In step S25, the first advertisement bitstream is inserted to the source multimedia bitstream.

In situations where multiple advertisements are broadcasted in cooperation with the source multimedia bitstream, the process in FIG. 13 may be iterated. That is, more original images may be further fetched from the source multimedia bitstream, candidate pixels are extracted from the original images, and advertisement bitstreams are located and obtained from the bitstream database. According to broadcasting time points of the original images in the source multimedia bitstream, the advertisement bitstreams are inserted to the source multimedia bitstream.

For example, a first advertisement bitstream is obtained according to a first original image, and the first advertisement bitstream is inserted to a source multimedia bitstream to obtain a first edited multimedia bitstream. From the source multimedia bitstream, a second original image is fetched at a time point with an interval with the first original image. An advertisement bitstream is located from the bitstream database according to the second original image. The advertisement bitstream corresponding to the second original image is then inserted to the first edited multimedia bitstream.

It should be noted that, since the same original image may include trademarks of different manufacturers, the candidate pixels obtained from the original image may then include a plurality of candidate pixel groups.

More specifically, the candidate pixels of the first original image may at the same time include a first candidate pixel group, a second candidate pixel group and a third candidate pixel group. Thus, when searching for the advertisement bitstream from the bitstream database, in addition to locating the advertisement bitstream corresponding to the first candidate pixel group, the advertisement bitstream corresponding to the second candidate pixel group also needs to be located.

That is to say, a plurality of keypoint groups stored in the advertisement bitstream database are compared according to the second candidate pixel group. The keypoint group satisfying the predetermined condition is selected from the keypoint groups. The advertisement bitstream corresponding to the selected keypoint group is selected as a second advertisement bitstream, which is then inserted to the source multimedia bitstream.

In a possible situation, a plurality of advertisement bitstreams may be located due to a plurality of candidate pixel groups are found. To broadcast all the advertisement bitstreams may get too long. At this point, only one or some of the advertisement bitstreams may be selected and broadcasted.

With the above preferred embodiment, the system for providing multimedia bitstreams is described. The system for providing multimedia bitstreams includes the bitstream database and the bitstream editing apparatus. The bitstream database includes the storage server and the keypoint extraction server; and the bitstream editing apparatus includes the transceiving unit and the editing unit.

In the bitstream database, the storage server stores the source multimedia bitstream, and a plurality of advertisement bitstreams corresponding to a plurality of reference patterns. The keypoint extraction server respectively performs keypoint extraction on the reference patterns to obtain a plurality of keypoint groups. After the keypoint groups are obtained by the keypoint extraction server, the storage server further stores the mappings between the keypoint groups and the advertisement bitstreams.

In the bitstream editing apparatus, the transceiving unit receives the source multimedia bitstream. The editing unit performs variation processing on the first original image fetched from the source multimedia bitstream to generate a plurality of transformed pictures. The editing unit further performs keypoint extraction according to comparison results of the transformed pictures to obtain a plurality of candidate pixels.

After the transceiving unit transmits the candidate pixels to the bitstream database, the bitstream database locates the first advertisement bitstream according to the candidate pixels. The editing unit then inserts the first advertisement bitstream received by the transceiving unit to the source multimedia bitstream.

Therefore, with the preferred embodiments of the present invention, advertisement contents can be arranged by a television station to more mutually and adaptively connect the advertisement contents and television programs, so as to stimulate purchase urges of consumers and thus enhance advertising efficiency. In further applications, the present invention can be implemented to an Internet television or multimedia bitstreams in other formats. For example, a provider of bitstreams of an Internet television provides different advertisement contents appropriate for different viewers according to what type of bitstream contents they watch.

For example, when a computer and kitchenware are both captured in a same image, an advertisement associated with a computer brand is selected and broadcasted if the audience is likely a viewer who prefers scientific program contents; or else an advertisement associated with kitchenware is selected and broadcasted if the audience is likely a viewer with household appliance preferences. Such modifications require more details to retrieve relative parameters and adjustment. These functions and applications can be flexibly modified by a person having ordinary skill in the art, and details thereof shall be omitted herein.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for multimedia bitstream editing, comprising:
   fetching a first original image from a source multimedia bitstream;
   performing variation processing on the first original image to generate a plurality of transformed pictures;
   performing keypoint extraction according to comparison results of the transformed pictures to obtain a plurality of candidate pixels;
   locating a first advertisement bitstream from an advertisement bitstream database according to the plurality of candidate pixels; and
   inserting the first advertisement bitstream to the source multimedia bitstream.

2. The method for multimedia bitstream editing according to claim 1, wherein the first original image is in a first octave, and the step of performing variation processing on the first original image to generate the plurality of transformed pictures implies step of:
   performing a variation calculation on the first original image according to a plurality of standard deviation values to generate the plurality of transformed pictures in the first octave.

3. The method for multimedia bitstream editing according to claim 2, wherein the variation calculation is a Gaussian calculation.

4. The method for multimedia bitstream editing according to claim 2, wherein the step of performing variation processing on the first original image to generate the plurality of transformed pictures further comprises steps of:
   performing octave scaling on the first original image to obtain the first original image in second octave; and
   performing the variation calculation on the first original image in the second octave according to the plurality of standard deviation values to generate the transformed pictures in the second octave.

5. The method for multimedia bitstream editing according to claim 4, wherein a size of the first original image in the second octave is smaller than a size of the first original image in the first octave.

6. The method for multimedia bitstream editing according to claim 2, wherein the step of performing keypoint extraction according to the comparison results of the transformed pictures to obtain the plurality of candidate pixels comprises steps of:
   obtaining a plurality of difference pictures in the first octave by comparing the plurality of transformed pictures, wherein each of the plurality of difference pictures comprises a plurality of difference pixels;
   selecting a plurality of extremum pixels having a local extremum by comparing the plurality of difference pixels; and
   selecting extremum pixels having a preferred identification property as the plurality of candidate pixels from the plurality of extremum pixels.

7. The method for multimedia bitstream editing according to claim 6, wherein the step of selecting the plurality of extremum pixels having the local extremum by comparing the plurality of difference pixels comprises steps of:
   selecting one of the plurality of difference pictures as a central difference picture;
   selecting a central difference pixel from a plurality of difference pixels comprised in the central difference picture;
   comparing a value of the central difference pixel with values of a plurality of adjacent difference pixels of the central difference pixel, respectively; and
   when the value of the central difference pixel has the local extremum compared to the values of the plurality of adjacent difference pixels of the central difference pixel, selecting the central difference pixel as one of the plurality of extremum pixels.

8. The method for multimedia bitstream editing according to claim 7, wherein the plurality of adjacent difference pixels comprise:
   in the central difference picture, a plurality of difference pixels comprised in an adjacent pixel block regarding the central difference pixel as a center; and
   in a difference picture adjacent to the central difference picture, a plurality of difference pixels comprised in a pixel block at a position corresponding to the adjacent pixel block.

9. The method for multimedia bitstream editing according to claim 6, wherein the step of selecting the extremum pixels having the preferred identification property as the plurality of candidate pixels from the plurality of extremum pixels comprises steps of:

deleting the extremum pixels without high contrast from the plurality of extremum pixels; and deleting the extremum pixels located at borders from the plurality of extremum pixels.

10. The method for multimedia bitstream editing according to claim 1, wherein the step of locating the first advertisement bitstream from the advertisement bitstream database according to the plurality of candidate pixels comprises steps of:

obtaining a first candidate pixel group according to the plurality of candidate pixels, wherein the first candidate pixel group records pixel descriptions corresponding to the plurality of candidate pixels;

comparing the first candidate group with a plurality of keypoint groups in the advertisement bitstream database to select a keypoint group satisfying a predetermined conditions from the keypoint groups; and selecting an advertisement bitstream corresponding to the keypoint group satisfying the predetermined condition as the first advertisement bitstream from the advertisement bitstream database.

11. The method for multimedia bitstream editing according to claim 10, wherein each of the plurality of keypoint groups in the advertisement bitstream database corresponds to a trademark pattern, a sign pattern, a symbol pattern, a text pattern or an identification pattern.

12. The method for multimedia bitstream editing according to claim 10, wherein the pixel descriptions corresponding to the plurality of candidate pixels are pixel description vectors obtained according to a pre-selected description block respectively centered at the plurality of candidate pixels.

13. The method for multimedia bitstream editing according to claim 10, wherein the predetermined condition implies the first candidate pixel group and the keypoint group being selected satisfying a predetermined similarity level.

14. The method for multimedia bitstream editing according to claim 1, wherein a first part of the plurality of candidate pixels corresponds to a first candidate pixel group, and a second part of the plurality of candidate pixels corresponds to a second candidate pixel group, the editing method further comprising steps of:

comparing the second candidate pixel group with a plurality of keypoint groups in the advertisement bitstream database to obtain a keypoint group satisfying a predetermined condition from the keypoint groups;

selecting the advertisement corresponding to the keypoint group as a second advertisement bitstream; and inserting the second advertisement bitstream to the source multimedia bitstream.

15. The method for multimedia bitstream editing according to claim 1, wherein the step of inserting the first advertisement bitstream to the source multimedia bitstream implies step of:

inserting the first advertisement bitstream to a segment posterior to the first original image in the source multimedia bitstream to obtain a first edited multimedia bitstream.

16. The method for multimedia bitstream editing according to claim 15, further comprising:

fetching a second original image from the source multimedia bitstream;

locating an advertisement bitstream corresponding to the second original image from the bitstream database; and inserting the advertisement bitstream corresponding to the second original image to the first edited multimedia bitstream.

17. The method for multimedia bitstream editing according to claim 16, wherein positions of the first original image and the second original image in the source multimedia bitstream are spaced by a broadcast time difference.

18. A system for multimedia bitstream editing, comprising:

a multimedia bitstream database, for providing a source multimedia bitstream;

an advertisement bitstream database, comprising a search engine and, providing a plurality of advertisement bitstreams; and a bitstream editing apparatus, comprising:

a transceiving unit, in communication with the multimedia bitstream database and the advertisement bitstream database, for receiving the source multimedia bitstream and the plurality of advertisement bitstreams; and an editing unit, electrically connected to the transceiving unit, for performing variation processing on a first original image fetched from the source multimedia bitstream to generate a plurality of transformed pictures, and performing keypoint extraction according to comparison results of the transformed pictures to obtain a plurality of candidate pixels, wherein, the advertisement bitstream database locates a first advertisement bitstream according to the plurality of candidate pixels, and the editing unit inserts the first advertisement bitstream to the source multimedia bitstream after receiving the first advertisement bitstream via the transceiving unit.

19. An apparatus for multimedia bitstream editing, comprising:

a transceiving unit, for receiving a source multimedia bitstream from a multimedia bitstream database; and an editing unit, electrically connected to the transceiving unit, for performing variation processing on a first original image fetched from the source multimedia bitstream to generate a plurality of transformed pictures, and performing keypoint extraction according to comparison results of the transformed pictures to obtain a plurality of candidate pixels;

wherein, the candidate pixels are transmitted to an advertisement bitstream database via the transceiving unit, the advertisement bitstream database locates a first advertisement bitstream according to the plurality of candidate pixels, and the editing unit inserts the first advertisement bitstream to the source multimedia bitstream after the transceiving unit receives the first advertisement bitstream.

20. A method for advertisement bitstream storage, comprising:

performing variation processing on a first reference pattern to generate a plurality of first reference transformed patterns;

performing keypoint extraction according to comparison results of the plurality of first reference transformed patterns to obtain a plurality of candidate keypoint pixels; and obtaining a first keypoint group according to the plurality of candidate keypoint pixels; and storing mapping between the first keypoint group and the first advertisement bitstream.

21. The method for advertisement bitstream storage according to claim 20, wherein the first advertisement bitstream corresponds to a plurality of reference patterns, and each of the plurality of reference patterns respectively corresponds to a keypoint group.

22. The method for advertisement bitstream storage according to claim 20, wherein the step of performing variation processing on the first reference pattern to generate the plurality of first reference transformed patterns implies step of:

performing a variation calculation on the first reference pattern according to a plurality of standard deviation values to generate the plurality of first reference transformed patterns.

23. The method for advertisement bitstream storage according to claim 22, wherein the variation calculation is a Gaussian calculation.

24. The method for advertisement bitstream storage according to claim 20, wherein the step of performing keypoint extraction according to the comparison results of the plurality of first reference transformed patterns to obtain the plurality of candidate pixels comprises steps of:

obtaining a plurality of first reference difference pictures by comparing the plurality of first reference transformed patterns, wherein each of the plurality of first reference difference pictures comprises a plurality of difference pixels;

selecting a plurality of extremum pixels having a local extremum by comparing the plurality of difference pixels; and selecting extremum pixels having a preferred identification property as the plurality of candidate pixels from the plurality of extremum pixels.

25. The method for advertisement bitstream storage according to claim 24, wherein the step of selecting the extremum pixels having the local extremum by comparing the difference pixels comprises:

selecting one of the plurality of the first reference difference pictures as a central difference picture;

selecting a central difference pixel from the plurality of difference pixels comprised in the central difference picture;

comparing a value of the central difference pixel with values of a plurality of adjacent difference pixels of the central difference pixel, respectively; and when the value of the central difference pixel has the local extremum compared to the values of the plurality of adjacent difference pixels of the central difference pixel, selecting the central difference pixel as one of the plurality of extremum pixels.

26. The method for advertisement bitstream storage according to claim 25, wherein the plurality of adjacent difference pixels comprise:

in the central difference picture, a plurality of difference pixels comprised in an adjacent pixel block regarding the central difference pixel as a center; and in a difference picture adjacent to the central difference picture, a plurality of difference pixels comprised in a pixel block at a position corresponding to the adjacent pixel block.

27. The method for advertisement bitstream storage according to claim 24, wherein the step of selecting the extremum pixels having the preferred identification property as the plurality of candidate pixels from the plurality of extremum pixels comprises steps of:

deleting the extremum pixels without high contrast from the extremum pixels; and deleting the extremum pixels located at borders from the extremum pixels.

28. The method for advertisement bitstream storage according to claim 20, wherein the step of storing the mapping between the first keypoint group and the first advertisement bitstream comprises steps of:

assigning a first index to the first keypoint group;

storing mapping between the first index and the first keypoint group; and storing mapping between the first index and the first advertisement bitstream.

29. The method for advertisement bitstream storage according to claim 20, wherein the first reference pattern is a trademark pattern, a sign pattern, a symbol pattern, a text pattern or an identification pattern.

30. A system for providing multimedia bitstreams, comprising:

a bitstream database, comprising:

a storage server, for storing a source multimedia bitstream, and a plurality of advertisement bitstreams corresponding to a plurality of reference patterns; and a keypoint extraction server, in communication with the storage server, for respectively performing keypoint extraction on the reference patterns to obtain a plurality of keypoint groups, wherein the storage server accordingly stores mappings between the keypoint groups and the plurality of advertisement bitstreams; and a bitstream editing apparatus, comprising:

a transceiving unit, in communication with the bitstream database, for receiving the source multimedia bitstream; and an editing unit, electrically connected to the transceiving unit, for performing variation processing on a first original image fetched from the source multimedia bitstream to generate a plurality of transformed pictures, and performing keypoint extraction according to comparison results of the transformed pictures to obtain a plurality of candidate pixels;

wherein, the transceiving unit transmits the plurality of candidate pixels to the bitstream database, the bitstream database locates a first advertisement bitstream according to the plurality of candidate pixels, and the editing unit inserts the first advertisement bitstream received by the transceiving unit to the source multimedia bitstream.

* * * * *